US011754590B2

(12) United States Patent
Youssef et al.

(10) Patent No.: US 11,754,590 B2
(45) Date of Patent: Sep. 12, 2023

(54) PARTICLE BASED ACCELEROMETER

(71) Applicant: UTI LIMITED PARTNERSHIP, Calgary (CA)

(72) Inventors: Ahmed Youssef, Calgary (CA); Naser El-Sheimy, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 76 days.

(21) Appl. No.: 17/298,647

(22) PCT Filed: Jan. 24, 2020

(86) PCT No.: PCT/CA2020/050081
§ 371 (c)(1),
(2) Date: May 31, 2021

(87) PCT Pub. No.: WO2020/150829
PCT Pub. Date: Jul. 30, 2020

(65) Prior Publication Data
US 2022/0011337 A1    Jan. 13, 2022

Related U.S. Application Data

(60) Provisional application No. 62/796,266, filed on Jan. 24, 2019.

(51) Int. Cl.
*G01P 15/093*     (2006.01)
*G01P 15/03*      (2006.01)
(Continued)

(52) U.S. Cl.
CPC .......... *G01P 15/093* (2013.01); *G01P 15/006* (2013.01); *G01P 15/032* (2013.01); *G01P 15/038* (2013.01); *G01P 15/18* (2013.01)

(58) Field of Classification Search
CPC .... G01P 15/006; G01P 15/032; G01P 15/093; G01P 15/18; G10P 15/038
See application file for complete search history.

(56) References Cited

U.S. PATENT DOCUMENTS

| 2,232,567 A | 2/1941 | Shroyer |
| 2,943,493 A | 7/1960 | Bosch |
| 2,988,920 A | 6/1961 | Lees |
| 2,993,382 A | 7/1961 | Orrange |

(Continued)

FOREIGN PATENT DOCUMENTS

CN         10612480 A    11/2016

OTHER PUBLICATIONS

Noureldin, A., Karamat, T., Georgy, J.. "Fundamentals of Inertial Navigation, Satellite-based Positioning and their Integration". Book. 2013. XVII, 1 Page. Springer.

(Continued)

*Primary Examiner* — Helen C Kwok
(74) *Attorney, Agent, or Firm* — Brion Raffoul

(57) ABSTRACT

Systems and methods relating to sensors for measuring acceleration. Two attached containers are each filled with different liquids. At each junction of the two liquids, an indicator is placed. When acceleration forces are applied to the sensor, the indicator moves when the boundary between the two liquids similarly move. The amount of movement of the boundary and of the indicator is proportional to the amount of acceleration for applied. A tracking subsystem tracks the position of the indicator and, by determining the amount of movement of the indicator, the amount of acceleration force applied can be calculated. The indicator can be a particle or it can be a beam-like element that deflects when the boundary between the two liquids move.

21 Claims, 10 Drawing Sheets

(51) Int. Cl.
*G01P 15/18* (2013.01)
*G01P 15/00* (2006.01)

(56) References Cited

U.S. PATENT DOCUMENTS

| | | | |
|---|---|---|---|
| 3,015,958 A | 1/1962 | Dove | |
| 3,068,704 A | 12/1962 | Parker | |
| 3,142,990 A | 8/1964 | Aske | |
| 3,175,404 A | 3/1965 | Entin | |
| 3,195,357 A | 7/1965 | Bentley | |
| 3,206,987 A * | 9/1965 | Cunningham | G01P 15/18 |
| | | | 310/90 |
| 3,550,457 A | 12/1970 | Raymond | |
| 3,577,786 A | 5/1971 | Schmidlin | |
| 4,068,613 A | 1/1978 | Rubey | |
| 4,384,487 A * | 5/1983 | Browning | G01P 15/093 |
| | | | 73/514.19 |
| 5,050,435 A * | 9/1991 | Pinson | G01P 15/093 |
| | | | 73/514.19 |
| 5,743,135 A | 4/1998 | Sayka et al. | |
| 6,276,206 B1 * | 8/2001 | Reime | G01P 15/18 |
| | | | 73/514.09 |
| 2003/0011480 A1 | 1/2003 | Fehrenkamp | |
| 2006/0230829 A1 * | 10/2006 | Byrd | G01P 15/18 |
| | | | 73/510 |
| 2009/0139329 A1 | 6/2009 | Shinogi | |
| 2011/0313684 A1 * | 12/2011 | Furrer | G01P 15/036 |
| | | | 702/41 |
| 2014/0360269 A1 * | 12/2014 | Burghardt | G01P 15/02 |
| | | | 73/535 |

OTHER PUBLICATIONS

Groves, Paul D., "Navigation using Inertial Sensors". IEEE Aerospace and Electronic Systems Magazine. vol. 30, No. 2, Feb. 2015. 28 pages.

Liu, S., Zhu, R.,"Micromachined Fluid Inertial Sensors". Sensors, vol. 17, No. 2. Feb. 14, 2017. 24 Pages. Tsinghua University, Beijing, China.

Leung, A., Jones, J., Czyzewska, E., Chen, J., Pascal, M.. "Micromachined accelerometer with no proof mass". International Electron Devices Meeting. IEDM Technical Digest. 1997. 4 Pages. Simon Fraser, Canada.

Leung, A.M., Jones, J., Czyzewska, E., Chen, J., Woods, B.. "Micromachined accelerometer based on convection heat transfer". Proceedings MEMS 98. IEEE. Eleventh Annual International Workshop on Micro Electro Mechanical Systems. An Investigation of Micro Structures, Sensors, Actuators, Machines and Systems. 1998. 4 Pages. Simon Fraser University, Canada.

Tsang, S., Haseeb, A., Karim, S., Parameswaran, A., Leung, A.. "Monolithically fabricated polymermems 3-axis thermal accelerometers designed for automated wirebonder assembly". 2008 IEEE 21st International Conference on Micro Electro Mechanical Systems. 2008. 4 Pages. Simon Fraser University, Canada.

White, Frank M.."Fluid Mechanics". Book. McGraw-Hill. 7th Edition. 2011. 6 Pages.

Carrera, E., Giunta, G., Petrolo, M.. "Beam Structures: Classical and Advanced Theories". Book. John Wiley & Sons, Ltd. 2011. XX, 181 Pages.

* cited by examiner

SUBJECTED TO VERTICAL ACCELERATION

RESIDUAL DEFLECTION

SCHEMATIC VIEW

TABLE 1. A SUMMARY OF IMUs CLASSIFICATION AS PER PERFORMANCE

| Performance | Strategic grade | Navigation grade | Tactical grade | Commercial grade [a] |
|---|---|---|---|---|
| Positional Error | 30 m/h ~100 m/h | 1 nmi[b]/h or 0.5 m/s | 10 – 20 nmi/h | Large Variation |
| Gyroscope Drift | 0.0001 – 0.001 °/h | < 0.01 °/h | 1 – 10 °/h | 0.1 °/s |
| Gyroscope Random Walk | – | < 0.002°/√h | 0.05 – < 0.02 °/√h | Several °/√h |
| Accelerometer Bias | 0.1 – 1 µg | < 100 µg | 1 – 5 mg | 100 – 1000 µg |
| Applications | ● Submarines<br>● Intercontinental ballistic missiles | ● General Navigation<br>● High precision georeferencing<br>Mapping | ● Integrated with GPS for mapping<br>● Weapons (Short time) | ● Research<br>● Low cost navigation<br>● Pedometers<br>● Anti-locking breaking<br>● Active Suspension<br>● Airbags |

[a] Also called automotive grade
[b] 1 nautical mile (nmi) ≈ 6,076 ft ≈ 1,851 m

FIG. 10

PARTICLE BASED ACCELEROMETER

CROSS REFERENCE TO RELATED APPLICATIONS

This application is a 35 U.S.C. 371 national stage filing and claims priority to International Application No. PCT/CA2020/050081 filed on Jan. 24, 2020, entitled "PARTICLE BASED ACCELEROMETER" which claims the benefit of U.S. Provisional Application No. 62/796,266 filed on Jan. 24, 2019 each of which are incorporated herein by reference in their entirety.

TECHNICAL FIELD

The present invention relates to tools for use in navigation. More specifically, the present invention relates to systems and methods relating to an accelerometer that uses the tracking of a particle to determine the acceleration forces being applied to a device.

BACKGROUND

Linear accelerometers are inertial sensors that are used to measure the linear acceleration of a moving platform that is moving a translational motion along the direction of the sensitive axis of the accelerometer. Typically, accelerometers are used for navigation purposes. The acquired acceleration thus needs to be transformed into distance and velocity measurement. Using these, the navigation states of the moving platform can be determined, along with the orientation derived from another set of inertial sensors (known as angular rate sensors or gyroscopes). The output acceleration from an accelerometer needs to be integrated once to determine the velocity, and then integrated again to find the distance traveled by the moving platform. The acceleration output needs to be oriented such that the computed distances and velocities of the moving platform can represent the navigation states with respect to a known coordinate system. To perform this, a process referred to as Inertial Navigation System (INS) Mechanization occurs to thereby compute the navigation states of the moving platform. It is noted that linear accelerometers need to be provided in the form of mutually orthogonal triads to encapsulate the motion of a moving platform in three dimensions (3D).

Because of the above, linear accelerometers are crucial to inertial navigation, as well as to a wide range of other applications. However, linear accelerometers are prone to various sources of errors that affect its accuracy in depicting the actual accelerations of a moving body. Thus, whenever linear accelerometers are used for navigation, the inherited errors within a linear accelerometer output affect the navigation solution acquired from the INS mechanization process.

The sources of errors that are inherited within the linear accelerometers include biases, the scale factor in the accelerometer's output signal, the bias instability range, and the noises within the accelerometer's measurements. The sources of these errors might vary as per the technology deployed to produce an accelerometer. However, any state-of-the-art linear accelerometer exhibits these errors in its output.

Linear accelerometers are considered as a mature kind of sensor in terms of performance, cost, and size. Hence, there is a wide range of stable and commercially available linear accelerometers that provide various characteristics which suit most applications. In terms of size and cost, there are sensors that are mass produced which operate on micro-electro-mechanical-systems (MEMS) technology. However, the performance of MEMS based accelerometers can be considered poor. This limits its applications in stabilization and consumer grade navigation purposes and such MEMS based accelerometers are relegated to being used for less demanding applications such as being used in smartphones. On the other hand, there are accelerometers which are of higher cost and higher performance that are used for higher performance-demanding applications. Linear accelerometers follow the categorization of inertial measurement units (IMU) in that IMUs are classified into different grades as per their expected performance. Table 1 (see FIG. 10) provides a summary of IMUs classification as per performance. Note that Table 1 is taken from [1].

There is a direct relation between the sensor performance grade and its cost. As per [2], it is stated that strategic grade IMUs can reach a cost of over $1 million per IMU. Navigation grade IMUs can reach a cost of up to $100,000 per unit while tactical grade IMUs can cost around $2000 to $50000 per unit. However, commercial grade IMUs are known to be extremely low cost, with accelerometers costing as low as $1 per unit while gyroscopes can cost as low as $10 per unit. Unfortunately, the low cost of such IMUs is also an indication of the low performance of such sensors, thereby making them unsuitable for inertial navigation applications. Consequently, a major research aspect for inertial navigation is to utilize low-cost sensors assemblies for inertial navigation and high precision applications.

Multiple attempts have been made to address the above noted issues. Some of these attempts are detailed below.

There have been various attempts to utilize fluid as an inertial mass in the literature. However, when compared with other technologies, fluid-based accelerometers can be considered rare and such accelerometers have not reached the same level of maturity, in terms of performance, size, and cost effectiveness, as that of fluid-based angular rate sensors.

Solution electrolytic accelerometers were first introduced within the German missile program during World War II. Solution electrolytic accelerometers are solid-state ion-based devices whose operation is based on the potential difference induced in an electrolyte due to ions traveling through it. For such sensors, the motion transduction mechanism is based on an electrolyte placed in a container. In such devices, the pick-off mechanism measures the electric potential difference along the electrolyte. When the sensor is subjected to external linear acceleration, a fluid flow of the electrolyte is generated. Consequently, the flow of ions within the electrolyte generates a potential difference which is measured by the readout mechanism. The generated potential difference is proportional to the applied acceleration. The pick-off mechanism provides an output electric potential difference with good linear proportionality to the applied acceleration. However, the electrolyte is thermally sensitive.

Viscous float type accelerometers represent a form linear accelerometer that utilizes fluid in its measurement of accelerations. This type of sensors is designed in a closed-loop form, in which the sensor incorporates a feedback mechanism to restore the sensing element to its stable state. Such sensors are alternatively called integrating accelerometers. A viscous float type accelerometer is a fluid-based inertial sensor in which the sensor uses a rotating fluid control volume to stabilize a float that is suspended within. The float therefore acts as a proof mass that is displaced along the sensor's sensitive axis whenever the sensor is subjected to a linear acceleration along said axis. The motion transduction mechanism includes a rotatable cylindrical fluid container. The longitudinal axis of the cylindrical container is mounted on a rotating shaft of a motor that initially rotates the whole container at a constant angular velocity. Within the cylindrical fluid container, a fluid of designated density fills a container at a specific pressure and a float is placed within the container. When the sensor is stationary, it is designed such that the float is suspended with its center of mass aligned at the midsection of the cylindrical container (i.e., fluid volume), along the longitudinal spin axis of the container and under the effect of the rotational current produced by rotating the cylindrical container. Whenever the sensor is subjected to linear acceleration along its sensitive axis, the float is displaced within the cylindrical container in a direction opposing to the applied acceleration with a displacement value that is proportional to the applied acceleration. Thus, the displacement of the float within the container provides an indirect measure of the applied acceleration and the applied acceleration is linearly related to the float displacement. The displacement of the float is picked-off with various forms of pick-off mechanisms and the sensors are classified based on which mechanisms are used. However, it should be noted that all viscous float type accelerometers share the same motion transduction mechanism. For the viscous float type accelerometers, the pick-off mechanisms are classified into four main categories, namely: inductive viscous float accelerometers, capacitive viscous float accelerometers, photoelectric viscous float accelerometers, and variable resistance viscous float accelerometers. Numerous patents have been reported for viscous float type accelerometers, such as [3]-[10].

Another form of fluid-based linear accelerometer was introduced by Schmidlin 1971 [11], and is referred to hereafter as a pressure-driven linear accelerometer. The sensor was designed as an open-loop system, where the sensor was designed to not have a feedback mechanism as the sensor does not contain a proof mass to detect the linear acceleration to which it is subjected. The scientific concept behind the sensor design is to use the differential hydrostatic pressure created on a fluid charge entrapped within a container as a direct measure of the linear acceleration. To clarify, it is known from the Navier-Stokes equations that the pressure gradient along with the viscous forces should be in equilibrium with the external inertial force imparted to the fluid. Consequently, if one manages to measure the pressure gradient, for a constant viscous force, the linear acceleration can be computed thereafter from the Navier-Stokes equations. However, the Schmidlin device just uses an analogy derived from Navier stokes equation, where it is postulated that linear acceleration is directly proportional to the generated pressure gradient.

In the Schmidlin device, the sensor basic internal structure constitutes a porous cylindrical container which can be made of porous ceramics or sintered powdered metal compacts. The porous container is filled with a charge of non-wetting heavy liquid, such as mercury, metal liquid, or the like. The non-wetting liquid is designed such that it does not fill the entire porous cylindrical container. The porous container is sealed on both its bases by two endcaps which share an intricate design. Each end cap is designed to have a means of gas inflow that is connected to a plenum fitted therewith. The plenum is then connected to the non-wetting liquid through a series of passages and orifices. It is noted that gas inflow means has a series of filters, valves, and inlet metering orifices to keep track of the mass flow rate being diffused through the system. The gas plenums are also provided with gas outflow orifices which are connected externally to a set of pressure manometers to measure the pressure differences. The pressure manometers are arranged such that there is a pressure manometer that is connected to both gas outflow orifices from both end caps. There are other two pressure manometers, where each is connected to one of the end caps, with their other branches subjected to atmospheric pressure to measure the absolute pressure of the gas within each end cap. The series of pressure manometers represent the pick-off mechanism of the sensor.

In the above device, when the pressure-driven accelerometer is stationary, a constant gas flow rate is pumped through the gas inflow means through the endcaps and to the non-wetting fluid while the excess volume of gas is being diffused out of the sensor through the porous walls of the cylindrical container. When this occurs, the pressure at both end caps is equal and thus, the pressure gradient is equal to zero and the accelerometer theoretically has a zero-acceleration output.

On the other hand, when the pressure driven accelerometer is subjected to linear acceleration along its sensitive axis (which is an axis parallel to the longitudinal axis of the porous cylindrical container) the liquid charge tends to follow the law of conservation of momentum. Consequently, pressure builds up on one endcap and reduces at the other endcap. This difference in pressure would affect the pressure by which the gas is pumped into the system and this is monitored by the pressure manometers. To clarify, the end cap that experiences elevated pressure for the gas outflow due to motion is going to register high absolute pressure value through the connected manometer. At the same time, the other end cap would register a lower absolute pressure value for the gas outflow. As such, the generated pressure difference between both endcaps can be measured using the differential pressure manometer and is double-checked by the two absolute pressure manometers. Accordingly, the linear acceleration can be computed depending on the proportionality with pressure difference.

Micro machined accelerometers represent a different form of fluid-based linear accelerometers. These accelerometers operate on the basis of the free-convection heat transfer of a tiny hot air bubble in an enclosed chamber. The sensor comprises a heater that is placed at the center of chamber. The heater is operated at high joule power. Adjacent to the heater, two temperature sensors are placed with one at each side of the heater. The temperature sensors are designed to operate at low joule power. The temperature sensors are either built as thermistors or thermopiles. A gas fills the chamber that contains the heater and the temperature sensors.

When the sensor is stationary, the heater heats the entrapped gas and lowers its density. When this occurs, free convection is induced and builds a temperature profile that is symmetrical, such that the two temperature sensors read the same value. However, when the sensor is subjected to lateral acceleration, the temperature sensors read different values. The temperature profile is thus deflected towards a direction opposite to the direction of the applied acceleration. The temperature difference is fed into a conditioning circuit which generates an electric signal that is proportional to the applied acceleration.

The first thermal convective single axis accelerometer was introduced by Leung et al. in 1997 (see references [12], [13]). A dual axis version of the sensor was introduced by Leung et al. in 1998 (see references [12], [14]). The sensor followed the same operating concept and motion transduction mechanism. However, instead of using a pair of thermal sensors, the dual axis thermal accelerometer utilized four thermal sensors that are placed on two orthogonal axes in a common plane. Because of this, the sensor can sense accelerations along two orthogonal axes. Advancements were made to this form of thermal accelerometers to try and enhance their performance. Attempts have been made to reach a monolithic triaxial thermal accelerometer. A triaxial thermal accelerometer was introduced by Leung et al. in 2011, which constituted a buckled cantilever assembly upon which the heaters and sensors were mounted [15].

Regarding the various types of accelerometers noted above, these suffer from various issues as detailed below.

Viscous float type accelerometers endure a common problem regardless of the sensor design. This problem is the impact of thermal variations on the behavior of the enclosed fluid. This, in turn, affects the sensor performance. In addition to this issue, the chosen pick-off and/or feedback re-balance mechanisms can also have various impacts on the performance of this type of sensors. For a sensor that uses a capacitive electric pick-off mechanism, a series of brushes and slip rings are required to transmit the acquired signal from the rotating fluid chamber to the signal conditioning circuit. This requirement increases the mechanical complexity of the sensor and affects its lifetime. Also, the feedback mechanisms depended on varying the fluid pressure to restore the sensing element to its stable position. For photoelectric viscous float accelerometers, the float rebalance in this type of sensor was achieved by changing the speed of the spin motors. Changing the spin speed of the fluid container has an effect of the float stability such that it might not maintain a central position within its containing chamber and have friction with the walls. For variable-resistance viscous float accelerometers, specific types of conductive fluids are required to be able to measure the applied accelerations. Inductive viscous float accelerometers require proper magnetic and electric shielding to avoid the impact of stray magnetic fields on the acquired signal from the sensor.

Pressure-driven accelerometers are expected to be prone to some limitations. Such limitations include being sensitive to shocks and vibrations as these are expected to affect the pressure within the liquid and thus can cause corrupted measurements of pressure differences. Another issue is that the pick-off mechanism of the sensor (i.e., the setup of pressure manometers) requires continuous calibration to account for gas inflow rates. Additionally, the sensor requires a constant inflow of gas to be pumped through each endcap and this can be hard to achieve precisely. The liquid within the sensor should be a non-wetting fluid such that the fluid would have a high surface tension value to thereby prevent the liquid from passing through the apertures of the porous wall. The porous container material should be chosen such that the aperture sizes should allow the gas to pass through while simultaneously entrapping the liquid.

Thermal accelerometers have been commercialized, despite their numerous limitations. Most of the studies in thermal accelerometers are concerned with optimizing the fluid, with a view to achieving a fluid whose thermal properties are adequate to achieve desired levels of performance for the thermal accelerometers. Such fluid thermal properties include, for example, thermal conductivity, thermal diffusivity, and kinematic viscosity. The studies also consider enhancing the temperature sensing mechanism within the accelerometer [12]. The other main research aspects to be considered, for micro-machined inertial sensors, are increasing the bandwidth, enhancing temperature compensation, and the full development of a monolithic IMU [12]. In addition, the research aspects include improving integration, sensitivity, and reducing thermal and cross-coupling errors [12].

To sum up, most of the fluid-based linear accelerometers are prone to errors due to shock and vibrations, and because of this, require proper platform stabilization to depict the actual dynamics. In addition, the pick-off mechanisms used require proper magnetic and electric shielding to eliminate the impacts of stray magnetic and/or electric fields. Finally, since the sensors use fluid as sensing elements, temperature and pressure stabilization are required to ensure proper sensor performance.

From the above, there is therefore a need for systems and methods which overcome or at least mitigate the shortcomings of the prior art.

SUMMARY

The present invention provides systems and methods relating to sensors for measuring acceleration. Two attached containers are each filled with different liquids. At each junction of the two liquids, an indicator is placed. When acceleration forces are applied to the sensor, the indicator moves when the boundary between the two liquids similarly moves. The amount of movement of the boundary and of the indicator is proportional to the amount of acceleration applied. A tracking subsystem tracks the position of the indicator and, by determining the amount of movement of the indicator, the amount of acceleration force applied can be calculated. The indicator can be a particle, or it can be a beam-like element that deflects when the boundary between the two liquids move.

In a first aspect, the present invention provides a sensor for sensing acceleration forces applied to a device on which said sensor is mounted, the sensor comprising:
  a first sealed container containing a first liquid;
  a second sealed container containing a second liquid, said first and second sealed contained having two common junction points such that, at each junction point, a boundary exists between said first and second liquids;
  two indicators, each indicator being located at one of said two common junction points between said first and said second sealed containers;
  a tracking subsystem for tracking positions of said indicators as at least a portion of said indicators move with said boundary;
  wherein
  boundaries between said first and second liquids are affected by acceleration forces applied to said device such that said boundaries move when an acceleration is applied to said device, an amount of movement of said boundary being dependent on an amount of acceleration force being applied to said device;
  said indicators are similarly affected by said movement of said boundaries such that an effect on said indicators by said movement is dependent on said amount of acceleration applied to said device.

In a second aspect, the present invention provides an accelerometer for determining acceleration forces applied to a device on which said accelerometer is mounted, the accelerometer comprising:
  a first subsystem for measuring acceleration forces applied on a first plane;
  a second subsystem for measuring acceleration forces applied on a second plane, said first plane and said second plane being orthogonal to one another;

wherein each of said first subsystem and said second subsystem comprises:
a first sealed container containing a first liquid;
a second sealed container containing a second liquid, said first and second sealed contained having two common junction points such that, at each junction point, a boundary exists between said first and second liquids;
two indicators, each indicator being located at one of said two common junction points between said first and said second sealed containers;
a tracking subsystem for tracking positions of said indicators as at least a portion of said indicators move with said boundary;
and wherein, for each subsystem,
boundaries between said first and second liquids are affected by acceleration forces applied to said subsystem such that said boundaries move when an acceleration is applied to said subsystem, an amount of movement of said boundary being dependent on an amount of acceleration force being applied to said subsystem;
said indicators are similarly affected by said movement of said boundaries such that an effect on said indicators by said movement is dependent on said amount of acceleration applied to said subsystem.

In a third aspect, the present invention provides a method for determining acceleration forces applied to an accelerometer that comprises two containers having at least one common junction point, each of said two containers containing first and second liquids such that, at each of said junction points, a boundary exists between said first and second liquids, said accelerometer further comprising at least one indicator, each of said at least one indicator being located at one of said at least one common junction point, the method comprising:
a) obtaining a first image of said at least one indicator when said at least one indicator is at rest;
b) obtaining at least one second image of said at least one indicator when said accelerometer is subjected to acceleration;
c) determining an amount of change for said at least one indicator between said first image and said at least one second image;
d) determining said acceleration forces based on said amount of change for said at least one indicator.

BRIEF DESCRIPTION OF THE DRAWINGS

The present invention will now be described by reference to the following figures, in which identical reference numerals refer to identical elements and in which:

FIG. 10 is a table referenced by the following description.

DETAILED DESCRIPTION

Figure 1:
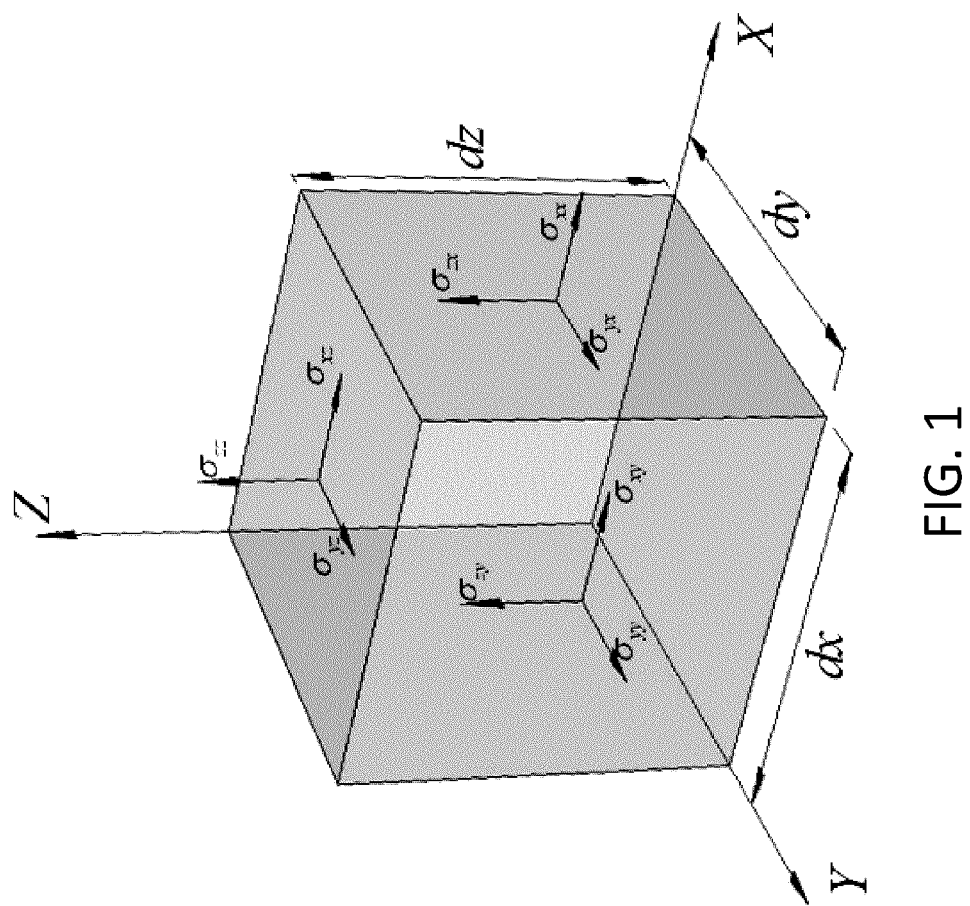
FIG. 1 illustrates the fluid infinitesimal element under effect of 3D stresses.

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

In one aspect of the present invention, there is presented a particle-based accelerometer sensor that a competent alternative solution when compared to the current accelerometer sensors. One implementation of the present invention provides a relatively cost-effective sensor that eliminates the drift error in its inertial measurements. This implementation also provides a high signal to noise (SNR) for its acceleration output signal.

The sensor according to one aspect of the present invention can thus be used reliably for inertial navigation applications, even in applications where high dynamic ranges and high sensitivity are required. This aspect of the present invention is different from most common state of the art accelerometers as the present invention uses a fluid as an inertial sensing mass while most current sensors use a solid proof mass. The accelerometer according to the present invention also utilizes an innovative motion pick-off detection mechanism that substantially enhances sensor performance.

One objective of the present invention is to substantially reduce bias instability within the output acceleration signal, especially since high bias instability is a characteristic of inertial sensors. Bias instability is a stochastic error that is encountered in all inertial sensors regardless of their grade or cost. One objective of the present invention is to provide a nearly-drift free accelerometer at a relatively low cost.

Another objective of the present invention is the eradication of errors that are typically related to electric-based pick-off mechanisms that are encountered in most of the state-of-the-art inertial sensors. Such errors include, but are not limited to, quantization errors that happen due to analog-to-digital signal conversion. One advantage of the present invention is that the sensor of the present invention does not need a signal conditioning mechanism within the sensor design to derive the acceleration signal from another measure quantity. This reduces the complexity of the sensor design and reduces the risk of errors within the signal conditioning phase of the measurement process.

Another object of the present invention is that of providing an output of substantially high SNR when compared to linear accelerometers of the same cost range, especially accelerometers that are utilized for inertial navigation applications.

As noted above, it is well-known that the performance of fluid-based inertial sensors is extremely affected by the system temperature. Therefore, it is an objective of the present invention to provide a fluid-based accelerometer that does not include moving parts except for a single particle. Such a design would not cause variations in the temperature of the system and would maintain constant temperature throughout the operation time of the sensor, assuming that the system assembly has proper shielding from ambient temperature. Additionally, the present invention ensures a design that is not affected by the variations in the magnetic fields within the environment in which the sensor is operated.

Additionally, another objective of the present invention is to provide a device that is compact such that it would be suited for typical navigation applications. As well, such a device would be compatible for various navigation platforms, especially in terms of size. Such navigation platforms include ground-based, aerial, and marine platforms. Furthermore, the design of the present invention ensures a simple structure that does not require special precautions or procedures in sensor fabrication, and operation processes.

In one aspect of the invention, there is provided a fluid-based triaxial accelerometer setup with the potential to be deployed as an inclinometer. The design of the present invention employs fluid as a sensing element for the applied inertial stimulus imparted to the sensor, with the inertial stimulus specifically being linear accelerations. The present invention relies on a control volume of Newtonian incompressible fluid which is designed to be sensitive to linear accelerations, thereby satisfying the basic fluid dynamics relations as discussed below.

As noted above, the sensor of the present invention employs a version of particle tracking to perform the inertial measurements. Particle tracking is a branch of fluid dynamics science in which the properties of fluids and fluid flows can be determined through tracking particles that are neutrally buoyant and which mimic the actual dynamics of the flow. Particle tracking implies the use of an imaging sensor that is used to track the particles, regardless of whether those imaging sensors are set up in fixed or moving positions along the examined flow.

To provide a basis for the particle tracking, the projectivity condition is implemented to determine the relative position of the particle with respect to the image space coordinate system. It is noted that the image space represents a constant view of the flow channel in which the particle is only in motion as result of the fluid flow. Since the object space geometry is known, the use of a single imaging sensor can determine the object space position of any point that is an element of the image space view. Consequently, the position of the particle can be determined directly.

The discussion below provides two embodiments of the present invention. The first embodiment is suited to measure acceleration values within a horizontal plane (i.e., a plane normal to the gravity vector at the point of measurement, on and near the earth's surface). The second embodiment is designed to measure accelerations in the vertical plane along the gravity vector direction at the instant of measurement. The overall accelerometer is therefore designed to measure accelerations within a frame whose z-axis always coincides with the gravity direction, on the earth's surface.

Embodiment 1

The design for this embodiment of the present invention is an open loop design. In this design, the sensor performs the measurement without requiring a feedback loop to restore the sensing element to its null position. The sensing element within the sensor assumes its null position whenever the external acceleration is unapplied or removed and this return to the null position depends only on the proper damping effect imposed by the sensor design.

Scientific Concept and Operation

As per [16], Newton's second law of motion states that the sum of external forces acting on a body in motion is equal to the rate of change of momentum of the body with respect to time. The momentum of a moving body is the product of its mass (m) and its velocity (v). The mathematical formulation of Newton's second law of motion is given by Equation 1.

$$\Sigma F_{external} = \frac{d}{dt}(mv) \qquad (1)$$

Applying Newton's second law of motion to unit volume of fluid flow, the mathematical formulation can be modified to represent the sum of external forces per unit volume, which should be equivalent to the rate of change of momentum per unit volume. Thus, by dividing Equation 1 by the volume of the control element of fluid (V) under study, the mathematical formulation of the Newton's second law of motion can be given as Equation 2:

$$\frac{\Sigma F_{external}}{V} = \Sigma f_{external} = \frac{d}{dt}\left(\frac{mv}{V}\right) = \frac{d}{dt}(\rho v) \qquad (2)$$

For the rightmost hand side of Equation 2, the differential can be evaluated by partial differentiation with respect to the fluid's density (ρ) (i.e. mass per unit volume), and the velocity field vector (v). The mathematical formulation of Newton's second law of motion can thus be written as Equation 3:

$$\Sigma f_{external} = \rho \frac{\partial v}{\partial t} + v \frac{\partial \rho}{\partial t} \qquad (3)$$

However, for a steady and incompressible fluid flow, the density of fluid is a constant value and this renders the term $$v \frac{\partial \rho}{\partial t}$$

equal to zero. Consequently, the sum of external forces per unit volume acting on a fluid should be equal to the product of fluid's density (ρ) and its acceleration field $$\left(\vec{a} = \frac{\partial v}{\partial t}\right),$$

and Equation 3 can take the abstract form shown as Equation 4:

$$\Sigma F_{external} = \rho \vec{a} \qquad (4)$$

To break down the sum of external forces per unit volume acting upon a fluid, one can assume an infinitesimal fluid element within a steady incompressible fluid flow of dimensions (dx,dy,dz) as shown by FIG. 1. Such an element is subjected to a set of external forces that should be in equilibrium with inertial force per unit volume ($\rho \vec{a}$), as deduced from Newton's second law of motion. The forces acting on a fluid element can be classified into two main categories, namely, surface forces, and body forces.

Surface forces are the forces caused by the stresses acting upon the surfaces of the control element. These forces mainly include the net of the hydrostatic pressure and the viscous stresses acting on the control element. Surface forces can be considered, by analogy to structural mechanical, as internal forces that occur due to the interaction of the fluid element with its neighboring fluid elements. The surface forces mainly occur due to gradients of stress along the spatial dimensions of the element, which are three dimensions in the case of a 3-D analysis.

Considering the same infinitesimal control element shown by FIG. 1, the surface forces are caused by the stresses impressed upon the surfaces of the control volume and are denoted hereafter as where i represents the direction of the stress, and j represents the face upon which the stress is acting. It is assumed that the surface stresses are not "Principal Stresses", which means that shear stresses exist due to fluid viscosity.

The stresses acting on the control volume cannot be represented by a 3-dimensional vector, rather they are represented by a 9-dimensional tensor ($\sigma$), as there are three components acting on each face. The stress tensor of the fluid element can be represented using Equation 5. It is noted that the pressure (p) always acts normal to a surface, so it exists only along the diagonal elements of the stress tensor, as shown by Equation 5. The difference in sign comes from the opposing effect of the viscous forces against the pressure in a fluid, as by definition viscous forces resist a fluid flow. The shear stresses are indicative of the viscous forces acting on the fluid elements and are denoted by ($\tau_{ij}$), where i represents the direction of the shear stress component, and j represents the face upon which the stress is acting.

$$\sigma = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix} = \begin{bmatrix} -p+\tau_{xx} & \tau_{xy} & \tau_{xz} \\ \tau_{yx} & -p+\tau_{yy} & \tau_{yz} \\ \tau_{zx} & \tau_{zy} & -p+\tau_{zz} \end{bmatrix} \qquad (5)$$

As stated earlier, the pressure and viscous forces are generated due to the gradient of stresses that occur along each dimension of the fluid element under study. The surface forces acting on the fluid element can be thought of as the difference between the forces acting each two opposing faces of the fluid element, as shown by FIG. 1. To clarify, one can consider the x-axis direction. The resultant surface forces ($\delta f_{surface/x}$) along the x-direction can be thought of as the product of the resultant stress along the x-direction ($\delta \sigma_x$) multiplied by the cross-sectional area (dA), as shown by Equation 6:

$$\delta f_{surface/x} = \delta \sigma_x \cdot dA \qquad (6)$$

As per the stress tensor shown in Equation 6, the resultant stresses along the x-direction ($\delta \sigma_x$) is evaluated as the vector sum of the stresses acting along the x-direction and can be written as shown in Equation 7. It is noted that the stresses along the x-direction are classified into inward directed stresses ($\sigma_{x/in}$) (which are acting along the negative x-direction) and outward directed stresses ($\sigma_{x/out}$) (which are acting along the positive x-direction) as shown in FIG. 1. It is intuitive that the stresses along the x-direction shown differ by an incremental value along each dimension (dx,dy,dz)

$$\delta \sigma_x = \sigma_{x/out} - \sigma_{x/in} \qquad (7)$$

$$\delta \sigma_x = \left[\left(\sigma_{xx} + \frac{\partial \sigma_{xx}}{\partial x} dx\right) - \sigma_{xx}\right] + \qquad (8)$$

-continued
$$\left[\left(\sigma_{xy} + \frac{\partial \sigma_{xy}}{\partial y} dy\right) - \sigma_{xy}\right] + \left[\left(\sigma_{xz} + \frac{\partial \sigma_{xz}}{\partial z} dz\right) - \sigma_{xz}\right]$$

By substituting from Equation 6 into Equation 7 and by dividing by the volume of the element (dV=dxdydz) to get the incremental resultant surface forces per unit volume along the x-direction ($\oint \delta \delta F_{surface/x}$), one can get the formula in Equation 9.

$$\delta F_{surface/x} = \frac{\partial \sigma_{xx}}{\partial x} + \frac{\partial \sigma_{xy}}{\partial y} + \frac{\partial \sigma_{xz}}{\partial z} \qquad (9)$$

Accordingly, the resultant stresses formula along the x-direction can be written as shown in Equation 10, in which the stresses are replaced by their equivalent values described by the stresses tensor ($\sigma$) shown earlier in equation (9).

$$\delta F_{surface/x} = -\frac{\partial p}{\partial x} + \frac{\partial \tau_{xx}}{\partial x} + \frac{\partial \tau_{xy}}{\partial y} + \frac{\partial \tau_{xz}}{\partial z} \qquad (10)$$

Similarly, it can be deduced that the resultant surface forces along the y-direction ($\delta f_{surface/y}$) and the z-direction ($\delta f_{surface/z}$) can be expressed as shown in Equations 11 and 12:

$$\delta F_{surface/y} = -\frac{\partial p}{\partial y} + \frac{\partial \tau_{yx}}{\partial x} + \frac{\partial \tau_{yy}}{\partial y} + \frac{\partial \tau_{yz}}{\partial z} \qquad (11)$$

$$\delta F_{surface/z} = -\frac{\partial p}{\partial z} + \frac{\partial \tau_{zx}}{\partial x} + \frac{\partial \tau_{zy}}{\partial y} + \frac{\partial \tau_{zz}}{\partial z} \qquad (12)$$

Accordingly, the incremental surface forces acting on the fluid element can be written in vector form in a single formula as shown in Equation 13:

$$\delta F_{surface} = \delta F_{surface/x} \cdot \hat{i} + \delta F_{surface/y} \cdot \hat{j} + \delta F_{surface/x} \cdot \hat{k} \qquad (13)$$

In Equation 13, ($\hat{i}$, $\hat{j}$, $\hat{k}$) represent unit vectors along the (x,y,z) directions of the infinitesimal fluid element under study. One can substitute from Equations 10, 11, and 12 into Equation 13 to result in a unified formula for the surface forces acting on the fluid element, as given by Equation 14:

$$\delta F_{surface} = \left(-\frac{\partial p}{\partial x} + \frac{\partial \tau_{xx}}{\partial x} + \frac{\partial \tau_{xy}}{\partial y} + \frac{\partial \tau_{xz}}{\partial z}\right)\hat{i} + \qquad (14)$$
$$\left(-\frac{\partial p}{\partial y} + \frac{\partial \tau_{yx}}{\partial x} + \frac{\partial \tau_{yy}}{\partial y} + \frac{\partial \tau_{yz}}{\partial z}\right)\hat{j} + \left(-\frac{\partial p}{\partial z} + \frac{\partial \tau_{zx}}{\partial x} + \frac{\partial \tau_{zy}}{\partial y} + \frac{\partial \tau_{zz}}{\partial z}\right)\hat{k}$$

By rearranging Equation 14, one can get to Equation 15, in which the surface forces are regrouped per their physical nature. To clarify, the pressure forces are grouped to be within one holistic term, and the shear viscous forces are grouped similarly.

$$\delta F_{surface} = -\left(\frac{\partial p}{\partial x}\hat{i} + \frac{\partial p}{\partial y}\hat{j} + \frac{\partial p}{\partial z}\hat{k}\right) + \left[\left(\frac{\partial \tau_{xx}}{\partial x} + \frac{\partial \tau_{xy}}{\partial y} + \frac{\partial \tau_{xz}}{\partial z}\right)\hat{i} + \qquad (15)\right.$$
$$\left.\left(\frac{\partial \tau_{yx}}{\partial x} + \frac{\partial \tau_{yy}}{\partial y} + \frac{\partial \tau_{yz}}{\partial z}\right)\hat{j} + \left(\frac{\partial \tau_{zx}}{\partial x} + \frac{\partial \tau_{zy}}{\partial y} + \frac{\partial \tau_{zz}}{\partial z}\right)\hat{k}\right]$$

To simplify Equation 15, and per the regrouping of surface forces, the gradient operator (∇) can be used to describe the resultant surface forces acting on any given fluid element ($\delta f_{surface}$). The gradient operator (∇(·)) is a vector operator that represents the rate of change of any given multidimensional quantity with respect to each dimension, such that for a 3-D vector, $$\left(\nabla(\cdot) = \frac{\partial}{\partial x}\hat{i} + \frac{\partial}{\partial y}\hat{j} + \frac{\partial}{\partial z}\hat{k}\right).$$

Accordingly, the resultant forces can be written as shown in Equations 16, and 17:

$$\delta F_{surface} = -\nabla p + \nabla \cdot \tau_{ij} \qquad (16)$$

$$\nabla \cdot \tau_{ij} = \begin{bmatrix} \frac{\partial}{\partial x}\hat{i} & \frac{\partial}{\partial y}\hat{j} & \frac{\partial}{\partial z}\hat{k} \end{bmatrix} \cdot \begin{bmatrix} \tau_{xx} & \tau_{xy} & \tau_{xz} \\ \tau_{yx} & \tau_{yy} & \tau_{yz} \\ \tau_{zx} & \tau_{zy} & \tau_{zz} \end{bmatrix} \qquad (17)$$

On the other hand, there are the body forces acting upon the fluid element. Body forces are the set of external forces that might act on the fluid element. Such forces include the electromagnetic or gravitational potentials acting on the entire mass of the elements. However, electromagnetic potentials can only affect substantially small masses of fluid and are dependent on the electromagnetic properties of the fluid. Accordingly, only the gravitational potentials are considered. Because of this, for the fluid element shown by FIG. 1, the gravitation force acting on such element can be written as shown in Equation 18:

$$\delta f_{gravity} = \rho dV \cdot \vec{g} \qquad (18)$$

In Equation 18, ($\vec{g}$) is a 3-D vector representing the acceleration due to gravity. The resultant gravitational force per unit volume ($\delta F_{gravity}$) can be calculated by dividing the formula in Equation 18 by the volume of the infinitesimal element (dV) and is shown by Equation 19:

$$\delta F_{gravity} = \rho \cdot \vec{g} \qquad (19)$$

Applying Newton's second law of motion on a unit volume of fluid, which was given earlier by Equation 4, we can get to what is referred to as the law of conservation of momentum for fluids in its general form, as shown by Equation 20. It is worth noting that, when the law of conservation of momentum is applied to an incompressible fluid in which the density is constant, the law of conservation of momentum is referred to as the Navier Stokes equations.

$$\Sigma F_{external} = \delta F_{surface} + \delta F_{gravity} = -\nabla p + \nabla \cdot \tau_{ij} + \rho \vec{g} = \rho \vec{a} \qquad (20)$$

In some typical applications, fluid can act as a rigid body when in motion. For a fluid to maintain a rigid body motion, there are some assumptions that should be fulfilled. Initially, in rigid body motion, the fluid particles move along in combined translation and rotation. In such cases, the relative motion is nonexistent, which means that there are no shear strains and stresses. Consequently, viscous force can be neglected. In such a case, the law of conservation of momentum can be reduced to what is referred to as the Euler equation. The Euler equation represents the law of conservation of momentum for inviscid fluids and is as shown by Equation 21:

$$\nabla p = \rho(\vec{g} - \vec{a}) \qquad (21)$$

For fluids to move in rigid body motion, it must be confined by walls for a long time, such that the fluid particles would translate and rotate holistically without relative motion. The fluid should be continuous within the confining container, regardless of the shape of the container.

To study a fluid motion as a rigid body motion, one should consider the pressure distribution within the fluid container because of the rigid body motion. Consequently, to study the pressure distribution due to rigid body motion for any given fluid, the objective is to determine a mathematical model that can describe what are referred to as isobars. Isobars are planes that pass through all points that have the same pressure within the container. It would be intuitive that a mathematical model that represents the isobars should implicitly represent the pressure distribution. Since the fluid is assumed to undergo a rigid body motion, then the isobars are considered parallel throughout the container.

Figure 2:
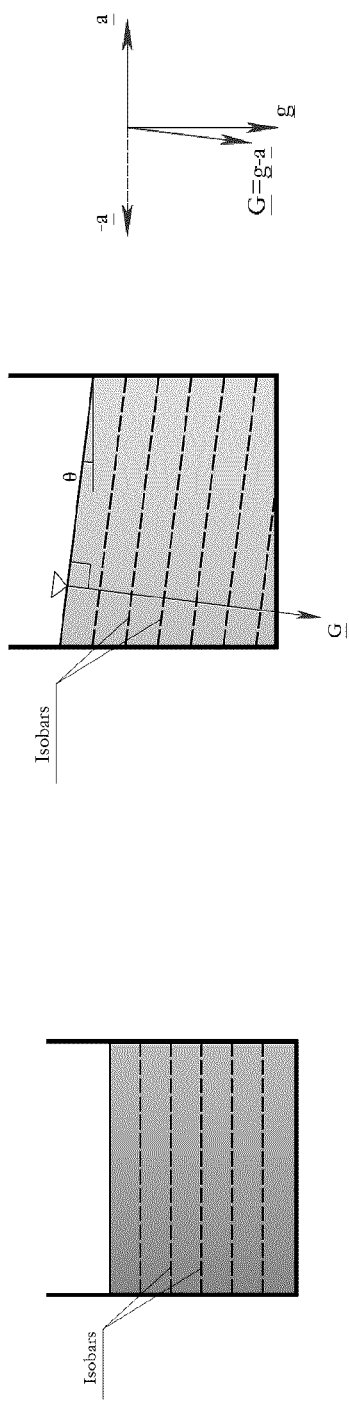
FIG. 2 show isobars of a fluid container both with and without linear horizontal acceleration.

To illustrate the rigid body motion for a given fluid, one can consider a fluid container as shown by FIG. 2. The fluid container is mounted on a moving platform that is assumed to move in translational linear motion. Consequently, it is sound to assume that the fluid flow, in such case, is a 2-D flow, neglecting the third dimension which is, for this case, the y-direction. It can also be shown by FIG. 2 that the shape of the isobars for such a container are parallel 2-D horizontal lines, when the container is static. However, when the container is moved, it is noticeable that the free surface of the fluid is tilted at an angle, where the free surface of the fluid represents the direction of the isobars, and hence reflects a new pattern of pressure distribution.

Accordingly, to formulate a mathematical model to represent the slope of the shown isobars, one can depend on Euler's equation as represented by Equation 21. However, in this case, the equation is applied for a 2-D flow in which the y-direction component is eliminated. The equation can be written as shown by Equation 22. It is noted that, for an isobar, the pressure gradient should be equal to zero, because all the points lying on an isobar have the same pressure. Accordingly, the terms in Equation 22 are equated to zero.

$$-\left(\frac{\partial p}{\partial x}\hat{i} + \frac{\partial p}{\partial z}\hat{k}\right) = \rho\left(-a_x\hat{i} + (-g - a_z)\hat{k}\right) = 0 \qquad (22)$$

In Equation 22, $$\left(\frac{\partial p}{\partial x}\hat{i} + \frac{\partial p}{\partial z}\hat{k}\right)$$

are the 2-D pressure gradient vector evaluated for the x and z directions, $(-a_x\hat{i}+(-g-a_z)\hat{k})$ is the moving platform acceleration component along the x and z directions respectively, and (g) is the magnitude of the acceleration due to gravity, and the negative sign represents the direction of the acceleration, which is against the positive z-direction. The above Equation 22 can be rearranged to represent the slope of the isobars, which is represented by the angle (θ) measured from the x-axis towards the isobar direction. The slope of the isobars can be given as shown in Equation 23.

$$\frac{dx}{dz} = \tan\theta = \frac{a_x}{g + a_z} \qquad (23)$$

The acquired formula can be verified graphically with the pressure gradient acting along the line of action of the resultant acceleration represented by the vector ($\vec{g}-\vec{a}$), as shown in FIG. 2, and the isobars (including the free surface if any) are perpendicular to that direction.

Thus, if one can measure the slope angle (θ), the linear acceleration of the moving platform ($a_x$) can be readily computed thereafter. However, with examination of Equation 23, it is required to have a measure of the acceleration components along the vertical direction ($a_z$) to be able to calculate the linear acceleration ($a_x$). Accordingly, the object of the second embodiment of an acceleration sensor is to measure the acceleration component in the vertical direction. This is discussed in detail below.

It should be noted that there are some undesirable effects that occur at the initial instants of the fluid motion, i.e. when the fluid particles slosh and flow out of sync until such effects are damped away. After the initial instability, the fluid flows in a rigid body motion. Ideally, such deleterious sloshing effects should not occur when the accelerations are to be measured. It is therefore preferable to impose opposing effects through damping mechanisms. Such mechanisms can eliminate such effects and force the fluid to act as a rigid body whenever it is subjected to any external accelerations.

To realize the abovementioned damping effects, one can use Bernoulli's equation and its corollaries to lay a scientific basis for such measures. Bernoulli's equation can be derived from the Euler equation applied to a single streamline of the fluid flow or it can be derived an energy equation from the laws of thermodynamics. Bernoulli's equation represents the relationships between pressure, velocity, and elevation in a frictionless flow. Bernoulli's equation was derived under the assumption of having a steady incompressible flow and it is applied for flow along a single streamline. It should be noted that, for frictionless flows, the fluid is assumed to be irrotational, and hence, all the streamlines within the fluid can be considered to possess the same energy. Bernoulli's principle states that the total energy of a fluid flow is constant along any given streamline, and it can be represented mathematically by Equation 24.

$$\frac{p_2 - p_1}{\rho} + \frac{1}{2}(v_2^2 - v_1^2) + g(z_2 - z_1) = 0 \tag{24}$$

In Equation 24, ($p_2-p_1$) is the pressure difference between any two given two points (points (1) and (2)) along a given streamline and ($v_2^2$) and ($v_1^2$) are the instantaneous velocities at points (1) and (2) respectively. In the equation, ($z_2-z_1$) is the height difference along the vertical direction between the same points (1) and (2).

As mentioned earlier, Bernoulli's equation represents an energy relation, in which the first term in Equation 24 represents the work done by the pressure. The second term represents the kinetic energy of the fluid flow along a given streamline. The third term represents the potential energy. In practical cases, the total energy of the flow is affected by losses along the flow trajectory. The losses are typically caused by viscous friction between the fluid and the container walls or by heat transfer or by additional obstructions along the fluid flow. Neglecting the heat transfer losses, the Bernoulli equation can be written as Equation 25. It is noted that the heat transfer losses are neglected based on having a thermal stabilizing mechanism.

$$\frac{p_1}{\gamma} + \frac{v_1^2}{2g} + z_1 = \frac{p_2}{\gamma} + \frac{v_2^2}{2g} + z_2 + h_f \tag{25}$$

In Equation 25, the above formulation of Bernoulli's principle represents the energy per unit weight for the fluid flow. The energy components per unit weights are referred to as energy heads and they are in units of length. In Equation 25, the terms $$\left(\frac{p_1}{\gamma}\right) \text{ and } \left(\frac{p_2}{\gamma}\right)$$

are the pressure head for the flow at points (1) and (2) respectively, $$\left(\frac{v_1^2}{2g}\right) \text{ and } \left(\frac{v_2^2}{2g}\right)$$

represent the kinetic energy head for the flow points (1) and (2) respectively, and ($z_1$) and ($z_2$) are the elevation heads at points (1) and (2) respectively. Similarly, ($h_f$) is the sum of head losses due to wall frictions, variations in flow cross-sections, and additional flow obstructions, and this can be evaluated as given using Equation 26.

$$h_f = \left(f \cdot \frac{l}{D} + \sum K\right) \cdot \frac{v_2^2}{2g} \tag{26}$$

The head losses are represented as losses in the kinetic energy of the fluid flow. In Equation 26, the resulting first term (f·l·$v_2^2$/2g·D) represents the kinetic head loss due to friction between the fluid and the walls of the container. The kinetic head loss due to friction (f·l·$v_2^2$/2g·D) is function of the friction coefficient (f), the flow length (l), and the fluid channel cross-sectional characteristic dimension (D). The friction coefficient is a function of the surface roughness of the container walls and the mode of flow, regardless of whether the flow is laminar or turbulent. The flow is determined to be laminar or turbulent as per Reynold's number.

The resulting second term (ΣK·$v_2^2$/2g) in Equation 26 represents head losses due to the additional flow obstructions and is a function of the sum of a series of coefficients (ΣK) that are determined experimentally depending on the nature of said obstruction. This obstruction can be in the form of constriction of the flow cross-section.

From the above, the sum of head losses induced would affect the total energy of the flow. This has the potential to realize the desired damping effect, as mentioned earlier, to ensure proper acceleration measurements.

Sensor Internal Structure

In one embodiment, the inertial sensors comprise three main basic components, namely: a motion transduction mechanism, a signal conditioning mechanism, and a read-out mechanism. The motion transduction mechanism includes a sensing element, a pick-off mechanism, and a damping mechanism. The signal conditioning mechanism is responsible for conversion of the acquired quantity from the pick-off mechanism to the measurable quantity. The read-out mechanism represents the part of the sensor that interfaces with external means by which the output acceleration signals are utilized.

Motion Transduction Mechanism

Sensing Element

The motion transducer in this embodiment of the invention utilizes a set of three fluid flow channels in the form of rectangular paths with a constriction at the middle of each branch of the flow channel placed on three mutually orthogonal axis. Each fluid flow channel has a circular cross section that is substantially smaller than the flow channel's smallest dimension.

Each fluid flow channel is half-filled with a driving fluid that has a relatively high density and low dynamic viscosity. The second half of the flow channel is filled with a damping fluid that has a relatively lower density and higher dynamic viscosity. At the interface between the two fluids, two trackable color-coded particles which are spherical in shape are placed. These particles represent the difference in height between the liquid interfaces in each branch within any of the fluid flow channels. The trackable particles are selected to have an intermediary relative density between the densities of the driving fluid and the damping fluid. The particles should have a density that ensures that they are suspended along the interface between both fluids.

Figure 3:
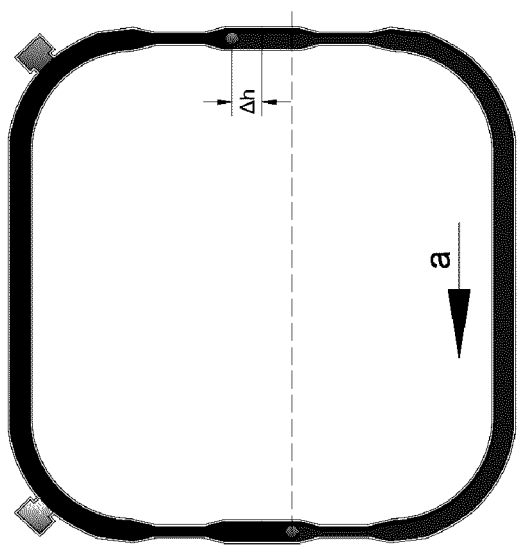
FIG. 3 are schematic diagrams of one embodiment of one aspect of the present invention.
Figure 3:
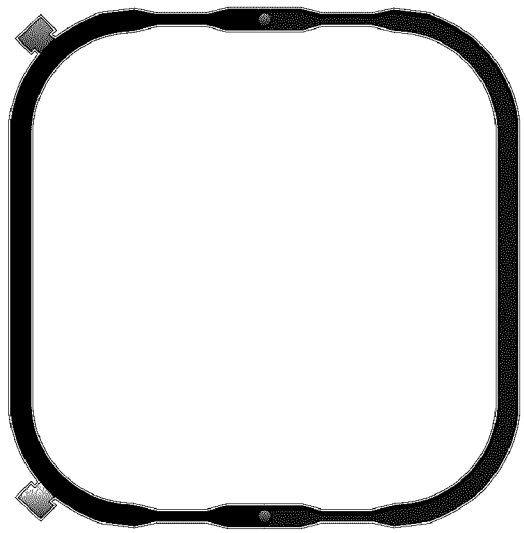

It is noted that flow channel is made of a material that is visually transparent. The chosen fluids are dyed with specific coding colors. Note, however, that the fluids are not required to be dyed for sensor operation—dyeing the fluids is more of a precaution. FIG. 3 shows a schematic view of one of the flow channels within the described embodiment. When the sensor is stationary, the fluid levels assume certain heights within each branch. When the sensor is subjected to a linear acceleration along the sensitive axis of the flow channel, as shown in FIG. 3, the fluid interface in one branch of the fluid flow channel rises and the fluid interface lowers in the other branch with an equal height difference. The difference in height between the two branches can provide a measure of the angle at which the isobars are reformed under acceleration. The applied acceleration can thus be computed using Equation 23, assuming there is a means by which the acceleration along the z-axis can be measured.

Pick-Off Mechanism

For the pick-off mechanism, as stated earlier, the sensor employs an imaging sensor as a pick-off mechanism. This imaging sensor is interfaced to an electronic processing unit that applies a designated image processing algorithm to track the particles lying along the interfaces between the driving fluid and the damping fluid. Once the position of each particle within each branch is determined, the inclination angle of the fluid interfaces can be determined, and the algorithm can then compute the linear acceleration.

Damping Mechanism

For this embodiment of the present invention, the proper damping effect is ensured by adding head losses along the path of the fluid, as described above. To elaborate, the fluid low channel is designed with four right-angled elbow turns and two constrictions along the fluid path. The additional constrictions and the trackable particles impose a partial damping effect, as the particles occupy a cross-sectional area of nearly 40% of the flow channel cross-section. The damping fluid of lesser density is used to enforce the damping of undesirable effects.

The chosen design ensures that the sensor can tolerate a high range of shocks and vibrations along any directions other than its sensitive axis.

Signal Conditioning Mechanism

An objective of the present invention is to provide a sensor that does not require any additional hardware within the sensor design to perform the signal conditioning. The signal is directly transmitted to the readout component as the acquired signal does not require any physical manipulation. To emphasize, the acquired acceleration signal does not require amplification nor quantization as the acquired signal is a direct digital signal as per the utilized pick-off mechanism.

Temperature and Pressure Stabilization

The performance of the sensor according to one aspect of the present invention, similar to any other fluid-based inertial sensors, relies on the temperature and pressure stability. The driving and damping forces governed by the fluid is dependent on whether the fluid properties are constant throughout the entire operation of the accelerometer. It is therefore preferable to provide some means for stabilizing the temperature and the pressure of the fluid control volume. Preferably, the pressure is kept constant by the design of a well-sealed fluid flow channel.

Sensor Design Parameters

Imaging Sensor

As noted above, the pick-off mechanism implies the use of an imaging sensor that acquires the output signal for the accelerometer. Preferably, the design of the accelerometer includes a set of specifications for the imaging sensors that are to be used to detect the inertial motion of the particles. Such specifications should include the field of view (F.o.V), focal length, whether the imaging sensor has variable or moving lenses, as well as the spatial and temporal resolution of the imaging sensor. It is noted that such specifications define some of the basic performance measures of the inertial sensor. To be specific, the bandwidth of the inertial sensor is directly equivalent to the frame rate of the imaging sensor. The sensor noise is a function of the spatial resolution of the imaging sensor such that, as the spatial resolution increases, the tracking precision of the particles is better, i.e., having lower noise values.

Any optoelectronic sensor can be used instead of typical imaging sensors to ensure a smaller physical size and a higher data rate for the accelerometer of the present invention. Optoelectronic sensors are any sensors that are used to detect intensity and position of light waves. In the current embodiment of the present invention, the imaging sensor used is a digital camera.

Fluids Specifications

Another aspect that should be considered for the sensor design optimization is the fluid properties for both the driving and damping fluids. One must address the impact of the ratios between corresponding properties for both fluids (i.e., the driving and damping fluids). The properties of such fluids include the density, dynamic viscosity, and temperature stability of the fluid viscosity. It should be clear that the fluids are to be varied to ensure the proper damping effect is reached.

Fluid Flow Channel

Another aspect that affects the performance of the present invention is the design of the fluid flow channel, especially in relation to the applied damping effect. A set of geometric considerations should be addressed to ensure that proper head losses are being applied as explained above. Preferably, one should consider the curvature of the bends within the flow channel to ensure the proper loss coefficient ($K_{bend}$). Additionally, the surface roughness of the fluid flow channel is also useful in determining the head losses within the fluid flow. As can be seen from Equation 26, the surface roughness determines the friction coefficient. As well, the overall length of the fluid flow channel, as well as the cross-sectional dimensions of the channel, would affect the driving and the damping forces. The variations in the flow channel cross-sections in the form of constrictions also affects the damping effect that is imposed upon the fluid flow. All these parameters should preferably be optimized to obtain the desired performance from the sensor according to the present invention.

Particle Shape and Size

It has been established above that the material of the particle to be tracked should be of a relative density that is an intermediate value between the driving and damping fluids to ensure that the particle remains on the interface between the two fluids. The shape of the particle, as well as its dimensions, should be varied to ensure optimal performance of the accelerometer.

Embodiment 2

The second embodiment of the present invention can be utilized to measure linear accelerations along its sensitive axis. However, this second embodiment is designed with an emphasis on measuring accelerations along the vertical direction. As noted above, this embodiment of the present invention is useful in computing a measure of linear acceleration along the vertical directions ($a_z$). This is because the linear acceleration is mathematically an input to the formula shown in Equation 23. From this formula, the horizontal component of acceleration ($a_x$) can be computed.

Similar to the first embodiment explained above, the design of the second embodiment is an open loop design as well. Accordingly, the proper damping effect is applied as per the chosen design and the design comprises a basic design aspect for the sensor. As such, the sensing element is restored to its null position through the predesignated damping effect ensured by the design.

Scientific Concept and Operation

This embodiment of the present invention operates based on measuring the deflection of a beam-like element that is loaded and damped by the effect of fluids. Accordingly, the scientific concept of this embodiment relies on the basics of beam theory to determine a mathematical formula that relates the deflection of the seismic beam-like element under the effect of fluid load and the applied vertical acceleration to the sensor.

The behavior of a beam under different conditions of loading can be described by what is known as the beam theory. For the present invention, simply supported beams under uniformly distributed lateral loading are considered. The dynamic behavior of simply supported beams under the impact of uniformly distributed loading is described by one form of the beam theory, known as Bernoulli-Euler beam theory. The Bernoulli-Euler theory uses the equation that describes the beam deflection under the effect of a dynamic uniformly distributed load, and it is governed by Equation 27.

$$\rho_{beam} A \frac{\partial^2 y}{\partial t^2} + EI \frac{\partial^4 y}{\partial x^4} = p(x, t) \tag{27}$$

Figure 4:
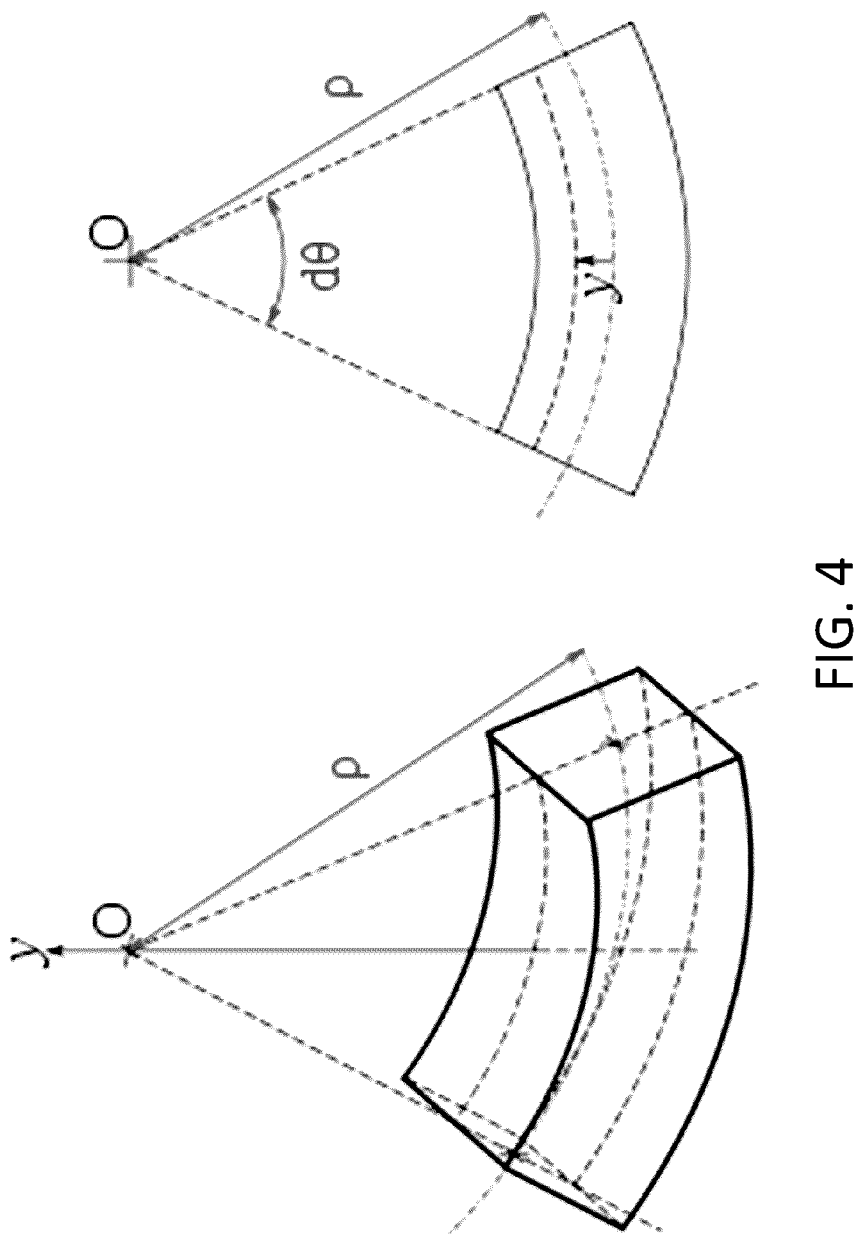
FIG. 4 is a static abstract model of the beam described by the Bernoulli-Euler model.

In Equation 27, the equation considers a simply supported beam of cross-sectional area (A), and moment of inertia (I), Young's elasticity model (E), and mass density ($\rho_{beam}$). In addition, $$\left(\frac{\partial^2 y}{\partial t^2}\right)$$

is the second order differential of the beam deflection (y) with respect to time (t), and $$\left(\frac{\partial^4 y}{\partial x^4}\right)$$

is the fourth order differential of the beam deflection (y) with respect to the axial dimension of the beam (x). FIG. 4 shows the static abstract model of the beam described by the Bernoulli-Euler model.

The Bernoulli-Euler beam equation can be considered as an equation of motion for the beam in which the first term represent the mass per unit length of the beam multiplied by the acceleration of the deflection and the second term represents a resistive force per unit length of the beam. This resistive force depends on the material and dimensional properties of the beam. The right-hand side of Equation 27 represents the applied dynamic varying uniformly distributed force.

The Bernoulli-Euler theory assumes a beam whose length is substantially larger than its cross-sectional dimensions and whose cross-section is constant along its length. The beam cross-section is assumed to be symmetrical such that it does not endure twisting nor torsion. The deflections of the beam are assumed to be relatively small in comparison to its dimensions. The beam is also assumed to be of an isotropic material that obeys Hooke's law in which the beam is linearly elastic and where the material has a linear stress-strain relationship. The main assumption of the Bernoulli-Euler theory is that plane cross-sections should remain a plane after being subjected to pure bending forces.

It is postulated that the Bernoulli-Euler equation can model the dynamic behavior of the described beam, if the beam remains elastic. However, the solution of the general dynamic form of the Bernoulli-Euler model is considered complex to solve analytically. Moreover, it is noted that the Bernoulli-Euler beam model considers only flexural deflections, neglecting the shear deflections, and the rotary inertia of the beam cross-section. The inclusion of such deflection terms to the model increases the model complexity and in such a case, the model is known as the Timoshenko beam model.

Accordingly, for the present invention and for simplification, the Bernoulli-Euler model is considered in the static loading case of a simply supported beam subjected to a uniformly distributed load (p(x)). For this case, the Bernoulli-Euler equation can be reduced to the form shown by Equation 28.

$$EI \frac{\partial^4 y}{\partial x^4} = p(x) \tag{28}$$

Despite having a dynamic case of loading during the operation of the sensor according to the present invention, an alternative approach is used to determine the applied acceleration from the simplified static Bernoulli-Euler model. The approach assumes an instantaneous sensing beam-like element whenever the measurement is acquired. Since the measurements are designed to be acquired at high rate (i.e., with short time interval between each two successive measurements), the assumption of having an instantaneous static mechanism is valid. The applied acceleration signal can thus be derived as a digital signal at each instance the beam's deflection is determined. The approach is discussed in detail below.

The static form of Bernoulli-Euler model is more intuitive and can be derived from basic observations for any given simply supported beam. However, the interested reader is referred to reference [17].

Figure 5:
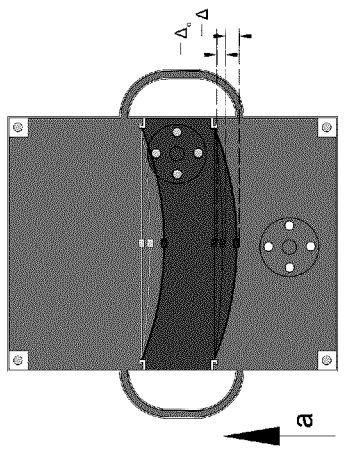
FIG. 5 show schematic views of another embodiment of another aspect of the present invention.
Figure 5:
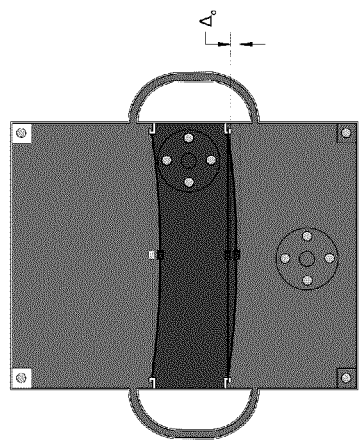
Figure 5:
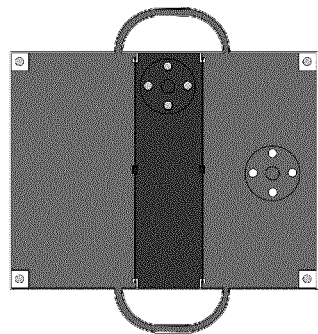

The algorithm to acquire the applied vertical acceleration depends on having a design in which a fluid compartment is formed between two elastic membranes designed in the form of two beam-like elements, as shown in FIG. 5. The beam-like elements are designed to have cross-sectional dimensions that are substantially smaller than their lengths. The elastic membranes are chosen to be of a material that has high ductility (i.e., can be elongated to relatively high values). The fluid compartment is placed within a hermetically sealed transparent compartment with the compartment having spaces above the upper elastic membrane and below the lower elastic membrane. The upper and lower clearances are interconnected with curved tubes and these are optionally filled with another fluid or left filled with air. Whether the tubes are filled with another fluid or air is determined as per the required damping effect and sensor sensitivity. The fluid, to fill the upper and lower spacings in the outer compartment, is discussed below.

For each instance of measurement, the devised vertical acceleration detection algorithm implies measurement of the deflection for the bottom elastic membrane along substantially small incremental distances along its length. Accordingly, the deflection profile of the elastic membrane is well-defined. Numerical differentiation is implemented to determine the fourth order differential of the deflection with respect to the axial dimension of the membrane $$\left(\frac{\partial^4 y}{\partial x^4}\right).$$

As per the Bernoulli-Euler equation, and knowing the material properties of the elastic membrane (E,I), the value of the uniform load acting per unit length of the elastic membrane (p) can be readily computed, as shown in Equation 28.

The value of the uniform load acting per unit length of the elastic membrane (p) can be broken down into two components, as given by Equation 29. These two components are the weight of the fluids per unit length of the elastic membrane and the virtual weight that occurs due to vertical acceleration acting per unit length of the elastic membrane.

$$p = \rho A \vec{g} \pm \rho A \vec{a} = \rho A (\vec{g} \pm \vec{a}) \qquad (29)$$

By rearranging the terms in Equation 29 and replacing the left-hand side (p) by its equivalent value from Equation 28, one can get a formula to calculate the applied acceleration from the measured deflection fourth order differential, as shown in Equation 30. It is noted that the assumption within Equation 30 a constant value for the uniformly distributed load (p), and, in turn, a constant value for the fourth order deflection differential $$\left(\frac{\partial^4 y}{\partial x^4}\right).$$

$$\vec{a} = \pm \frac{p}{\rho A} = \pm \frac{EI}{\rho A} \frac{\partial^4 y}{\partial x^4} \qquad (30)$$

Whenever the applied acceleration changes direction or is removed, the elastic membrane is subjected to a dynamic damping decay for the deflection as the membrane goes through various modes of shape. To mitigate such damping decay effect, and to obtain an optimal damping effect, one can implement an analytical dynamic model of the elastic membrane using, for instance, a finite element method. Alternatively, one can determine a proper damping effect by experimental calibration and varying the design of the elastic membrane to ensure a proper damping effect. For this implementation of the present invention, it has been chosen to experimentally determine the proper design to ensure the optimal damping effect. The design parameters that need to be considered for having a proper damping effect is discussed below. It is worth noting that a proper solution may be implemented by including all of the deflection components through a generalized form of Timoshenko model. This model can then be solved using, for instance, finite element modeling.

Sensor Internal Structure

As discussed earlier for the first embodiment of the present invention, this second embodiment encapsulates the same components within any inertial sensor. The only altered components of the sensor are the motion transduction and damping mechanisms, which are discussed in detail below. Other than that, the pick-off mechanism, signal conditioning, and temperature stabilization are the same as discussed above for the first embodiment.

Motion Transduction Mechanism

As stated above, the motion transduction mechanism of the second embodiment of the present invention comprises a fluid compartment which is made from a transparent material. The compartment is designed to have two fluid inlets. Across the fluid compartment, two beam-like elements are mounted within the fluid compartment and are fixed at both ends such that they can be approximately modeled as simply supported beams. The approximation of the beam-like elements as simply supported beams is acceptable because the focus is the flexural deflection under the effects of bending moments, with no regard for shear of normal forces acting on the beam-like element. For each beam-like deflectable element, the longitudinal dimension is chosen to be substantially larger than its cross-sectional dimension and this satisfies one of the main assumptions of the Bernoulli-Euler's beam theory. The beam-like elements divide the fluid compartment into three partitions. The partition between the beam-like elements holds the driving fluid. The other two partitions contain the damping fluid such that the two partitions are laterally connected through two laterally attached tubes. The two partitions of the damping fluid are connected to have proper immediate pressure redistribution and dissipation for any additional pressure created as a result of motion and this helps to regularize the damping process over the proper time interval.

Similar to the first embodiment of the present invention, there are two fluids utilized within the design. One fluid is employed as a driving fluid and the other fluid is a damping fluid. The driving fluid is the fluid responsible for deflecting the beam like element such that it causes the proper amount of deflection that is detectable by the imaging sensor (i.e., pick-off mechanism) without causing the failure of the element. The object of using a damping fluid is to have an additional means by which the damping effect is imposed to the sensor to restore the deflectable element to its null position. The damping fluid ensures that the deflectable element does not fail under intensive loading when subjected to high dynamics. A schematic view of the second embodiment of the present invention is shown in FIG. 5.

As explained above, when the sensor is stationary, there is a residual deflection along the midsection of the bottom beam-like deflectable element. However, when the sensor is subjected to vertical acceleration, the deflection within the deflectable element is increased or decreased as per the imparted vertical acceleration, as described by Equation 30. To emphasize, the imaging sensor (i.e., the pick-off mechanism) tracks the deflection values of the bottom beam-like element by utilizing a designated image processing algorithm. The deflection profile of the beam-like element measures the values of the element deflection. Thus, by solving the differential equation as shown in Equation 30, the applied additional acceleration can be determined.

Sensor Design Parameters

Imaging Sensor

The same specifications postulated for the first embodiment of the present holds for this second embodiment, as this embodiment shares the same pick-off mechanism as the first embodiment.

Fluids Specifications

For the driving fluid, the fluid should be chosen such that its mass density imposes the minimal value of residual deflection upon the elastic beam-like element. The driving fluid should be chosen to have minimal dynamic viscosity to thereby enhance the sensor sensitivity. The density of the driving fluid represents the main load that would affect the deflectable beam-like element. Thus, the driving fluid should be chosen such that it maximizes the maximum deflection that could be reached by the beam-like element and this implicitly means increasing the dynamic range of the accelerometer.

For the damping fluid, the fluid properties to be considered are the mass density and the dynamic viscosity. It is noted that the use of a damping fluid is optional and such a damping fluid is not a crucial design aspect of the sensor. As stated earlier, the purpose of using a damping fluid is that of imposing a proper damping effect within the sensor operation. If the damping provided to the sensing element of the sensor (i.e., the driving fluid and the beam-like element) is sufficient, then there is no further need for a damping fluid. The upper and lower partitions of the fluid compartment of the second embodiment can be filled with fluid and this fluid can be air, pressurized gas, or a light liquid. To sum up, the damping fluid that should be used should be determined experimentally to ensure that the sensor reaches its desired level of performance.

Beam Material

The maximum deflection, maximum tensile strength, and damping coefficient of the beam like material are all dependent on Young's modulus of elasticity, the length of the element, and the cross-sectional dimensions of the element. The material of the deflectable material should be chosen such that it has high elasticity and high ductility. The chosen material should also ensure that Hooke's law holds for the complete input range of the sensor. It is noted that Hooke's law implies that the relation between the stress and strain for a given material is linear if the material is elastic. The cross-sectional dimensions of the element are also indicative of the moment of inertia of the deflectable beam-like element.

Another aspect that should be considered when optimizing the beam material is the fixation condition of the beam-like elements. As stated earlier, the beam-like elements are modeled approximately as simply supported beams and this is an acceptable assumption for most mid-range dynamics. It is not an exact solution for the boundary conditions for the equation set forth above. The boundary conditions (i.e., supports) of the beam-like element should be considered to achieve the optimal modeling for the sensor.

Sensor Assembly

The following section shows the overall assembly of the sensor by fusing both embodiments, as discussed above. It is noted that the current embodiment of the invention is subject to variations and modifications to reach the optimum sensor design, in terms of cost, structure simplicity, size, and performance. The sensor, as stated above, is introduced as a triaxial gyroscopic assembly which can be adopted to operate as a single axis accelerometer, as per the application requirements. This embodiment of the present invention assumes the triaxial configuration for the sake of generalization and with the emphasis on the sensor being adaptable for inertial navigation applications.

Figure 6:
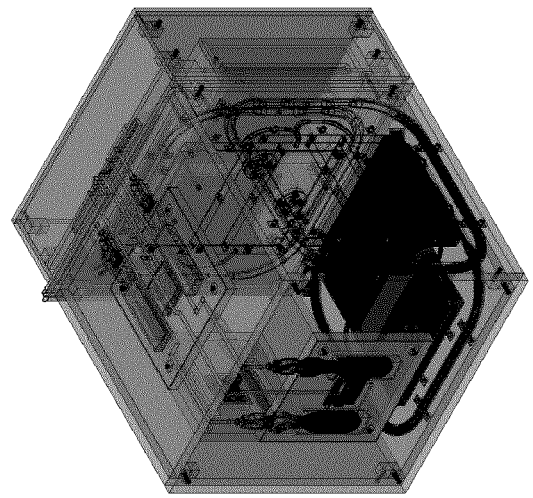
FIG. 6 show 3D perspective views of the sensor according to another aspect of the present invention.
Figure 6:
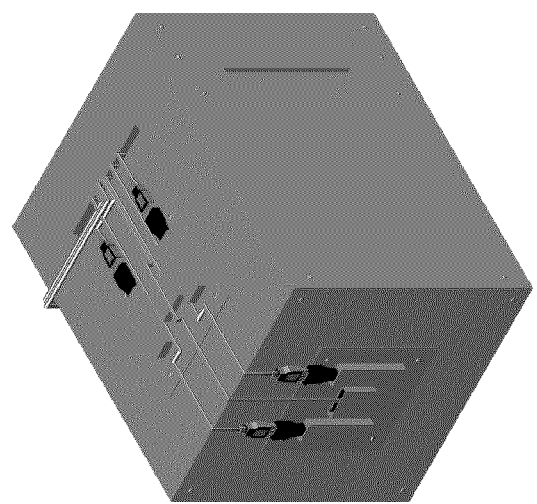
Figure 7:
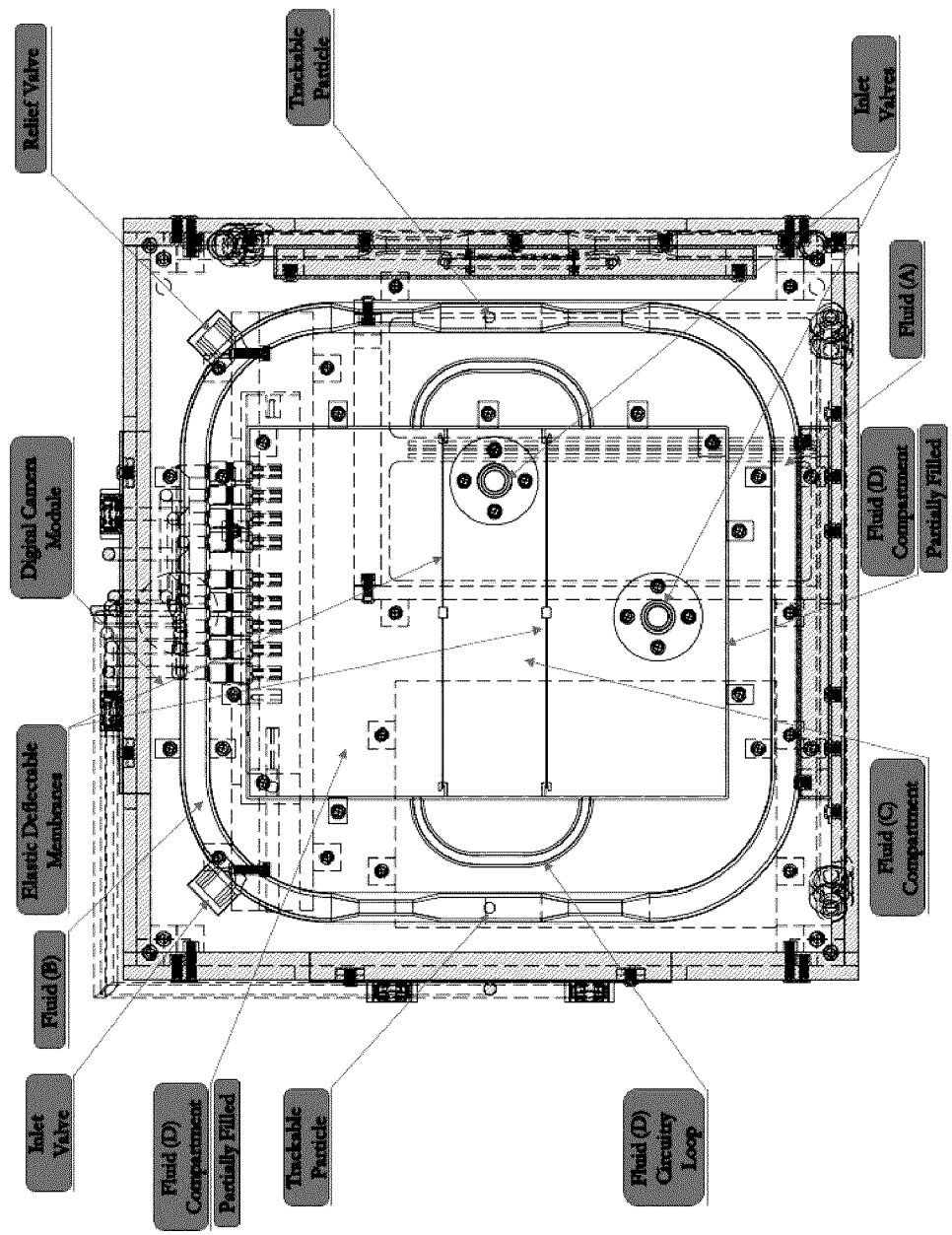
FIG. 7 is an elevation sectional view of the sensor illustrated in FIG. 6.
Figure 8:
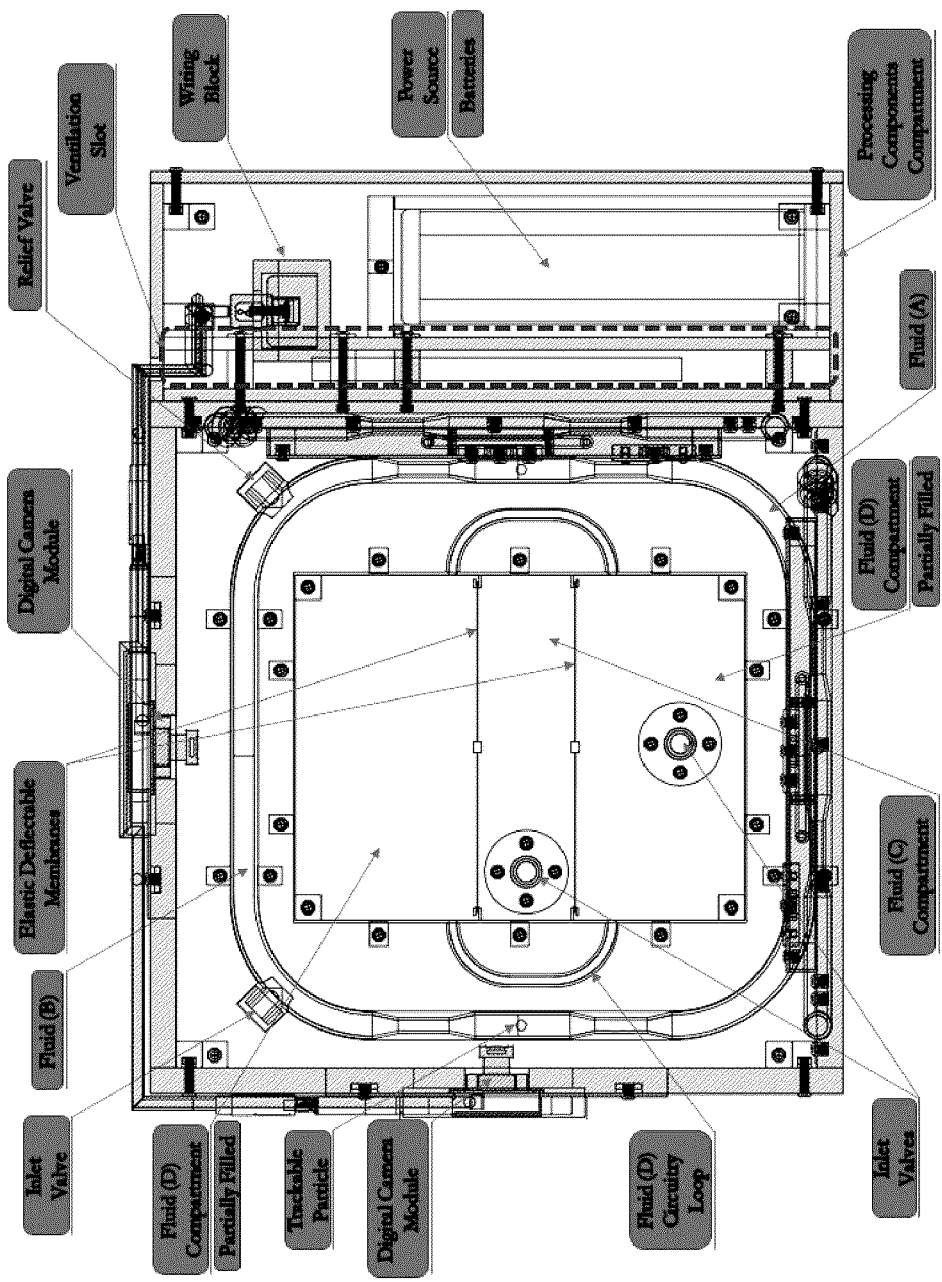
FIG. 8 is a side sectional view of the sensor illustrated in FIG. 6.
Figure 9:
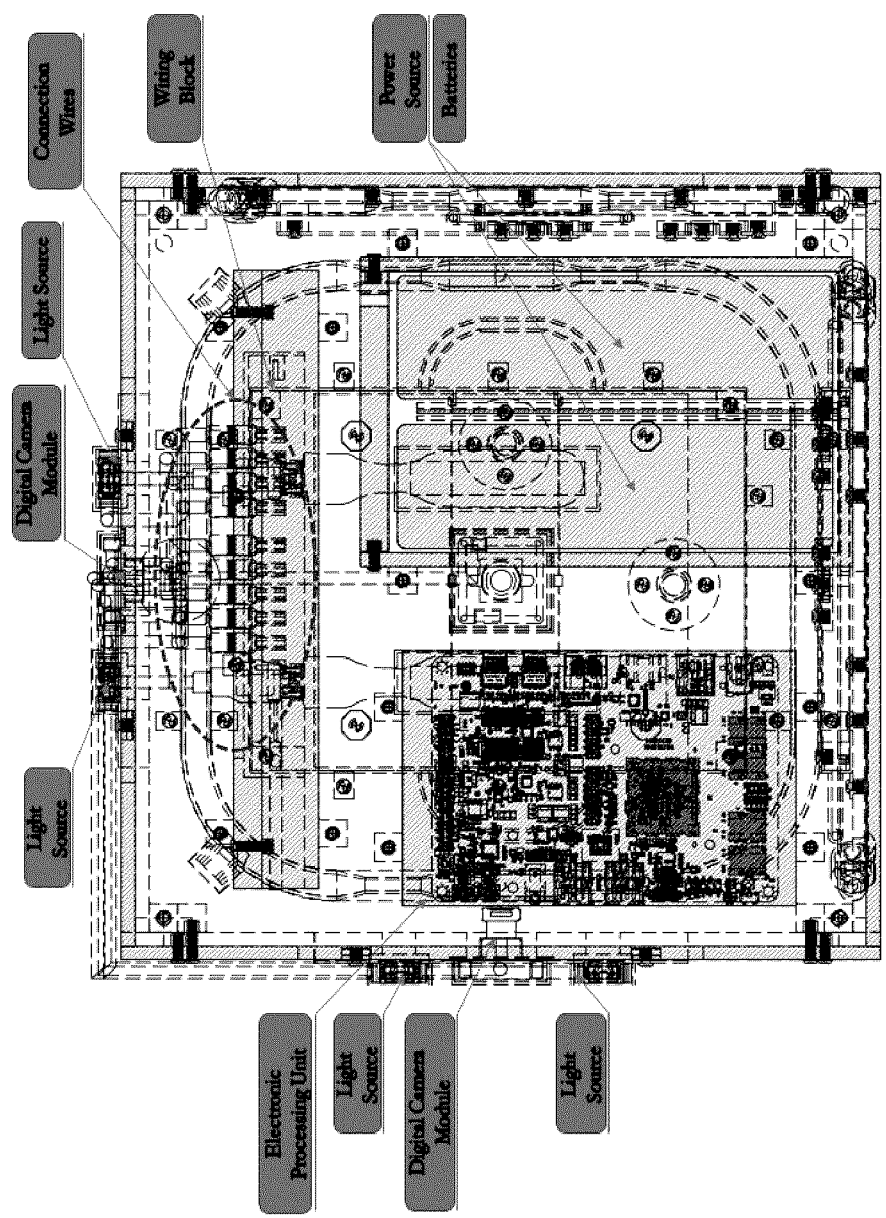
FIG. 9 is a back-sectional view of the sensor illustrated in FIG. 6.

FIG. 6 shows a 3D perspective view of the sensor assembly, along with a section view of some parts, to provide an insight on the sensor in its final form. FIG. 7 shows an elevation section through the sensor while FIG. 8 shows a side section view of the sensor assembly. FIG. 9 shows a back section through the sensor.

As shown in the above noted figures, the sensor comprises a set of three perpendicular planes in the form of a 3D printed cube and is made from a material that is sturdy enough to withstand the operation conditions. Each plane has a fluid flow channel (for the first embodiment of the sensor) and a rectangular shaped fluid compartment (for the second embodiment of the sensor). Both the fluid flow channel and the fluid compartment are made of a transparent material such as glass, acrylic, or equivalent material that ensures transparency and sufficient material strength to resist vibrations and shocks. The material must also allow manufacturing tolerances that ensure that the fluid flow channel can be hermetically sealed to preserve the pressure of the contained fluid at a constant value.

For the first embodiment of sensor, each fluid flow channel has a fitted valve that is used for filling the channel with fluid and as an entry passage way to the particle. The fitted valve can also be used as another valve for excess fluid flow. As explained earlier, each flow channel is filled with two fluids (i.e., driving and damping fluids) that are chosen to optimize the performance of the sensor. It is noted that, in the figures, the driving fluid is referred to as fluid (A) and the damping fluid is referred to as fluid (B). Two color-coded spherical particles are inserted within each branch of the fluid flow channel such that the particle is suspended in the interface between the two fluids within each branch with specific known dimensions. The material of each particle is chosen such that the particle manufacturing process ensures a smooth surface for the particle. The smooth surface of the particle minimizes the chance of creating micro turbulences around the particle as such turbulences might affect the particle motion within the channel. The particles are color-coded to facilitate and ensure the capacity of the digital image processing phase within the sensor operation. The particles are tracked within each fluid flow channel and the proper particle to be considered is determined by applying the digital image processing algorithm. The processing algorithm defines the time series of the location of each particle within the set of concentric flow channels. For each particle, the motion rate is determined instantly.

Regarding the choice of fluids, it is preferred that the driving fluid have a high enough density to ensure that the fluid applied the proper amount of load on the deflectable membrane. In addition, the driving fluid should also have a high enough surface tension to prevent slippage of the driving fluid through the clearances left at the wall of the apparatus. Also, the driving liquid should be a cohesive liquid. In one implementation, mercury was used as the driving liquid as this liquid satisfied the criteria for the use of the apparatus as an accelerometer.

Regarding the damping fluid, this fluid may be any fluid that satisfied having a high enough viscosity to dampen the inertial forces applied by the driving fluid on to the deflectable membrane. In one implementation, the material used as a damping fluid was air. It should, however, be noted that any material may be used as a damping fluid or as a driving fluid as long as that material has the properties noted above.

For the second embodiment of sensor, each fluid compartment is fitted with two inlet valves. One inlet valve is used to fill the partition of the fluid compartment entrapped between the deflectable elastic membranes with the driving fluid, referred to in the figures as fluid (C). The second inlet valve is used to fill the partitions of the fluid compartment above and below the beam-like elements with the damping fluid, referred to as fluid (D) in the figures. The beam-like elements are color-coded such that the deployed image processing algorithm can detect and measure the deflections of such elements.

For each plane within the sensor that contains a fluid flow channel and a fluid compartment, there is an opposing plane that contains a high resolution small-sized digital camera module with high frame rate and a large F.o.V. Preferably, the digital camera modules have a F.o.V. within 80° to 120°. Adjacent to the digital camera module, on any given face, a pair of light sources are mounted, one on each side of the digital camera module. The light sources are used to illuminate the fluid flow channels. Accordingly, the triaxial sensor should contain a set of three digital camera modules, each is which is placed on a face opposite a face containing the fluid channels. In addition to the camera modules, the triaxial sensor contains a set of six light sources. The assembly of digital camera modules and the light sources are connected to a wiring block that facilitates the connection of the electronic elements to the on-board electronic processing unit. The on-board electronic processing unit is used to implement the designed processing algorithm in real time.

The electronic processing unit is connected to an interface which can be considered as a controller that can be used for providing feedback for a machine or a robot or can be used for performing automated mobile navigation and mapping. The interface also includes a monitor that provides the measurements for instantaneous visualization. The interface may also include a storage module for data storage. The total assembly of electronic modules care connected to a power supply, as shown in FIG. 9.

The sensor should be provided with thermal compensation mechanism that accounts for changes in ambient temperature as well as for internal temperature variations, as discussed above. The thermal compensation mechanism comprises a set of internal ventilation passage ways that isolates the fluid-contained compartments, as depicted in FIGS. 7, 8, and 9. The thermal compensation mechanism includes a thermal sensor (not shown in the above figures) that measures the system temperature within the sensor. The measured temperatures are fed back into the processing unit to apply a thermal compensation to the acquired angular rate measurements. The thermal compensation model is predetermined for the sensor through a series of calibration tests that may be performed as an integral part of the sensor manufacturing process.

To better understand the various aspects of the present invention, the reader is directed to the listing of citations below. As noted above, the contents of the citations below are hereby incorporated by reference herein in their entirety.

[1] A. Noureldin, T. B. Karamat, and J. Georgy, *Fundamentals of Inertial Navigation, Satellite-based Positioning and their Integration*, 1st ed. Berlin: Springer-Verlag Berlin Heidelberg, 2013.

[2] P. D. Groves, "Navigation using inertial sensors [Tutorial]," *IEEE Aerospace and Electronic Systems Magazine*, vol. 30, no. 2, pp. 42-69, February 2015.

[3] M. Bosch and J. F. Kishel, "Accelerometer," 2,943,493, 5 Jul. 1960.

[4] S. Lees, "Null type integrating accelerometer," U.S. Pat. No. 2,988,920 A, 20 Jun. 1961.

[5] R. J. Orrange, "Integrating Accelerometer with Digital Readout," 2,993,382, 25 Jul. 1961.

[6] B. Parker, "Gas Bearing Accelerometer," 3,068,704, 18 Dec. 1962.

[7] V. H. Aske, "Accelerometer," 3,142,990, 4 Aug. 1964.

[8] L. P. Entin, "Accelerometer," 3,175,404, 30 Mar. 1965.

[9] E. P. Bentley and C. A. Speas, "Acceleration Sensitive Device," 3,195,357, 20 Jul. 1965.

[10] H. A. Raymond, "Fluid Accelerometer," 3,550,457, 29 Dec. 1970.

[11] A. E. Schmidlin, "Flueric Accelerometer," 3,577,786, 4 May 1971.

[12] S. Liu and R. Zhu, "Micromachined Fluid Inertial Sensors," Sensors, vol. 17, no. 2, p. 367, February 2017.

[13] A. M. Leung, J. Jones, E. Czyzewska, J. Chen, and M. Pascal, "Micromachined accelerometer with no proof mass," in *Electron Devices Meeting, 1997. IEDM'97. Technical Digest., International*, 1997, pp. 899-902.

[14] A. M. Leung, J. Jones, E. Czyzewska, J. Chen, and B. Woods, "Micromachined accelerometer based on convection heat transfer," in *Micro Electro Mechanical Systems, 1998. MEMS 98. Proceedings., The Eleventh Annual International Workshop on*, 1998, pp. 627-630.

[15] S.-H. Tsang, A. H. Ma, K. S. Karim, A. Parameswaran, and A. M. Leung, "Monolithically fabricated polymer-mems 3-axis thermal accelerometers designed for automated wire bonder assembly," in *Micro Electro Mechanical Systems, 2008. MEMS 2008. IEEE 21st International Conference on*, 2008, pp. 880-883.

[16] F. M. White, *Fluid mechanics*, 6th ed. New York, N.Y.: McGraw-Hill, 2009.

[17] E. Carrera, G. Giunta, and M. Petrolo, *Beam Structures: Classical and Advanced Theories*. John Wiley & Sons, 2011.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A sensor for sensing acceleration forces applied to a device on which said sensor is mounted, the sensor comprising:
   a first sealed container containing a first liquid;
   a second sealed container containing a second liquid, said first and second sealed containers having two common junction points such that, at each junction point, a boundary exists between said first and second liquids;
   two indicators, each indicator being located at one of said two common junction points between said first and said second sealed containers; and
   a tracking subsystem for tracking positions of said indicators as at least a portion of each of said indicators moves with its respective boundary,
   wherein
   said boundaries between said first and second liquids are affected by acceleration forces applied to said device such that said boundaries move when an acceleration is applied to said device, an amount of movement of each of said boundaries being dependent on an amount of acceleration force being applied to said device; and
   said indicators are similarly affected by said amount of movement of said boundaries such that an effect on said indicators by said movement is dependent on said amount of acceleration force applied to said device.

2. The sensor according to claim 1, wherein said tracking subsystem is an imaging tracking subsystem that tracks a position of said at least said portion of said indicators.

3. The sensor according to claim 1, wherein at least one of said two indicators is at least one particle whose position is trackable by said tracking subsystem.

4. The sensor according to claim 1, wherein at least one of said two indicators is a beam-like element and wherein a portion of said beam-like element deflects whenever said respective boundary moves, a deflection of said beam-like element being proportional to said acceleration forces applied to said device.

5. The sensor according to claim 1, wherein said first liquid and said second liquid are differently colored liquids that are immiscible in one another.

6. The sensor according to claim 3, wherein said at least one particle is neutrally buoyant in both of said first and said second liquids.

7. The sensor according to claim 1, wherein said tracking subsystem comprises a data processing module for calculating acceleration forces based on said amount of movement of said boundaries as determined by an amount of movement of said portion of said indicators.

8. An accelerometer for determining acceleration forces applied to a device on which said accelerometer is mounted, the accelerometer comprising:
   a first subsystem for measuring acceleration forces applied on a first plane; and
   a second subsystem for measuring acceleration forces applied on a second plane, said first plane and said second plane being orthogonal to one another,
   wherein each of said first subsystem and said second subsystem comprises:
   a first sealed container containing a first liquid;
   a second sealed container containing a second liquid, said first and second sealed containers having two common junction points such that, at each junction point, a boundary exists between said first and second liquids;
   two indicators, each indicator being located at one of said two common junction points between said first and said second sealed containers; and
   a tracking subsystem for tracking positions of said indicators as at least a portion of each of said indicators moves with its respective said boundary,
   and wherein for each of said first and said second subsystem,
   said boundaries between said first and second liquids are affected by acceleration forces applied to said each of said first and said second subsystem such that said boundaries move when an acceleration is applied to said each of said first and said second subsystem, an amount of movement of each of said boundaries being dependent on an amount of acceleration force being applied to said each of said first and said second subsystem;
   said indicators are similarly affected by said amount of movement of said boundaries such that an effect on said indicators by said movement is dependent on said amount of acceleration force applied to said each of said first and said second subsystem.

9. The accelerometer according to claim 8, wherein for at least one of said first subsystem and said second subsystem, said tracking subsystem is an imaging tracking subsystem that tracks a position of said at least said portion of said indicators.

10. The accelerometer according to claim 8, wherein for at least one of said first subsystem and said second subsystem, at least one of said two indicators is at least one particle whose position is trackable by said tracking subsystem.

11. The accelerometer according to claim 8, wherein for at least one of said first subsystem and said second subsystem, at least one of said two indicators is a beam-like element and wherein a portion of said beam-like element deflects whenever said respective boundary moves, a deflection of said beam-like element being proportional to said acceleration forces applied to said at least one of said first and said second subsystem.

12. The accelerometer according to claim 8, wherein for at least one of said first subsystem and said second subsystem, said first liquid and said second liquid are differently colored liquids that are immiscible in one another.

13. The accelerometer according to claim 8, wherein for at least one of said first subsystem and said second subsystem, said at least one particle is neutrally buoyant in both of said first and said second liquids.

14. The accelerometer according to claim 8, wherein for at least one of said first subsystem and said second subsystem, said tracking subsystem comprises a data processing module for calculating acceleration forces based on said amount of movement of said boundaries as determined by an amount of movement of said portion of said indicators.

15. A method for determining acceleration forces applied to an accelerometer that comprises two containers having at least one common junction point, each of said two containers containing first and second liquids such that, at said one or each of said junction points, a boundary exists between said first and second liquids, said accelerometer further comprising at least one indicator, each of said at least one indicator being located at one of said at least one common junction point, the method comprising:
   a) obtaining a first image of said at least one indicator when said at least one indicator is at rest;
   b) obtaining at least one second image of said at least one indicator when said accelerometer is subjected to acceleration;
   c) determining an amount of change for said at least one indicator between said first image and said at least one second image;
   d) determining said acceleration forces based on said amount of change for said at least one indicator.

16. The method according to claim 15, wherein said at least one indicator is a beam-like element.

17. The method according to claim 16, wherein said amount of change for said at least one indicator is an amount of deflection of said beam-like element.

18. The method according to claim 15, wherein said at least one indicator is a marker that is buoyant in said first and second liquids.

19. The method according to claim 18, wherein said amount of change for said at least one indicator is an amount of displacement of said at least one indicator between a first position in said first image and at least one second position in said at least one second image.

20. The method according to claim 17, further comprising determining said acceleration forces based on said amount of deflection.

21. The method according to claim 19, further comprising determining said acceleration forces based on said amount of displacement.

* * * * *